(12) United States Patent
Kawakami et al.

(10) Patent No.: US 11,886,839 B2
(45) Date of Patent: Jan. 30, 2024

(54) NON-TRANSITORY COMPUTER-READABLE RECORDING MEDIUM, FUNCTION GENERATION METHOD, AND INFORMATION PROCESSING DEVICE

(71) Applicant: FUJITSU LIMITED, Kawasaki (JP)

(72) Inventors: Kentaro Kawakami, Kawasaki (JP); Moriyuki Saito, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 17/736,156

(22) Filed: May 4, 2022

(65) Prior Publication Data
US 2022/0261224 A1 Aug. 18, 2022

Related U.S. Application Data

(63) Continuation of application No. PCT/JP2020/000184, filed on Jan. 7, 2020.

(51) Int. Cl.
*G06F 8/30* (2018.01)

(52) U.S. Cl.
CPC .................. *G06F 8/315* (2013.01)

(58) Field of Classification Search
CPC ........................................... G06F 8/315
USPC ...................................................... 717/116
See application file for complete search history.

(56) References Cited

U.S. PATENT DOCUMENTS

| 6,247,174 | B1* | 6/2001 | Santhanam | G06F 8/447 717/154 |
| 7,318,143 | B2* | 1/2008 | Biles | G06F 9/30054 712/15 |
| 2003/0093780 | A1* | 5/2003 | Freudenberger | G06F 8/443 717/153 |
| 2004/0093319 | A1 | 5/2004 | Ogasawara et al. | |

(Continued)

FOREIGN PATENT DOCUMENTS

| JP | H11-224199 A | 8/1999 |
| JP | 2000-056981 A | 2/2000 |

(Continued)

OTHER PUBLICATIONS

Kong et al., "When Polyhedral Transformations Meet SIMD Code Generation," ACM, 2013, 12pg. (Year: 2013).*
Nonaka et al., "Design and Implementation of Superinstructions for JavaScript Virtual Machine Generation System for Embedded Systems eJSTK," IPSJ, 2019, 13pg. (Year: 2019).*

(Continued)

*Primary Examiner* — Ryan D. Coyer
(74) *Attorney, Agent, or Firm* — Fujitsu Intellectual Property Center

(57) ABSTRACT

Provided is a non-transitory computer-readable recording medium storing a function generation program that causes a computer to execute a process, the process including referring to a storage unit that stores instruction information about an instruction to generate a first function that corresponds to the instruction and receives one or more arguments representing one or more operands of the instruction, generating first code inside the first function, where the first code calls a second function that returns machine language representing a process executed by the instruction for the (Continued)

one or more operands represented by the one or more arguments, and generating second code inside the first function, where the second code writes the machine language in a memory.

12 Claims, 45 Drawing Sheets

(56) References Cited

U.S. PATENT DOCUMENTS

| | | | | |
|---|---|---|---|---|
| 2004/0230958 | A1* | 11/2004 | Alaluf | G06F 8/447 |
| | | | | 717/118 |
| 2005/0235270 | A1* | 10/2005 | Sanyal | G06F 8/433 |
| | | | | 717/136 |
| 2011/0047359 | A1 | 2/2011 | Eichenberger et al. | |
| 2012/0075316 | A1 | 3/2012 | Kim et al. | |
| 2013/0067441 | A1* | 3/2013 | Lafreniere | G06F 8/41 |
| | | | | 717/146 |

FOREIGN PATENT DOCUMENTS

| | | |
|---|---|---|
| JP | 2001-344113 A | 12/2001 |
| JP | 2004-062830 A | 2/2004 |
| JP | 2013-502648 A | 1/2013 |
| JP | 2013-543616 A | 12/2013 |

OTHER PUBLICATIONS

Wu et al., "gpucc: An Open-Source GPGPU Compiler," ACM, 2016, 12pg. (Year: 2016).*

Kosei MARUOKA et al., "Compiling Method for Vector Accelerator Using LLVM (Technique for Compiling Vector Accelerator Code Using LLVM)", Information Proceeding Society of Japan(IPSJ), System Architecture (ARC), ISSN: 2188-8574, SIG Technical Report, vol. 2016-ARC-221, No. 4, pp. 1-6, Aug. 1, 2016 (Total 6 pages) [online] https://ipsj.ixsq.nii.ac.jp/ej/?action=repository_uri&item_id=172900&file_id=1&file_no=1 (Cited in ISR).

International Search Report and Written Opinion of the International Searching Authority (Form PCT/ISA/210, 220, and 237), mailed in connection with PCT/JP2020/000184 and dated Feb. 10, 2020 (Total 8 pages).

* cited by examiner

FIG. 3

```
// Assume that parameter q is stored in R2 at first.
    mov   R0, #0              // R0 stores counter i.  Assign initial value 0.
L0:
    load  R1, [Tbl[R0]]       // Load value of Tbl[i] into R1
    div   R1, R1, R2          // Assign value of Tbl[i]/q to R1
    store [Tbl[R0]], R1       // Save calculated value back to Tbl[i]
    add   R0, #1              // Increment value of counter i by one
    jmplt R0, #16, L0         // Return to L0 if value of counter i is less than 16
    mov   R8, #0              // R8 stores counter j.  Assign initial value 0.
L1:
    mov   R0, #0              // R0 stores counter i.  Assign initial value 0.
L2:
    load  R1, [in[R8][R0]]    // Load value of src[j][i] into R1
    load  R2, [Tbl[R0]]       // Load value of Tbl[i] into R2
    div   R2, R2, R1          // Calculate in[j][i] / Tbl[i] and assign to R2
    store [out[R8][R0]], R2   // Save calculated value back to out[j][i]
    add   R0, #1              // Increment value of counter i by one
    jmplt R0, #16, L2         // Return to L2 if value of counter i is less than 16
    add   R8, #1              // Increment value of counter j by one
    jmplt R8, #1000000, L1    // Return to L1 if value of counter j is less than one million
```

FIG. 5

```
for(int i = 0; i < 16; i++) {
    Tbl[i] /= q;
}
```
---- 16a

```
mov(R9, address of array in);
mov(R10, address of array out);
mov(R8, 0); // Initial value for loop counter for 1,000,000 times L1:
for(int i=0; i<16; i++) {
  mov(R0, i); // Value of index in array
  load(R1, base(R9), offset(R0));

switch(Tbl[i]) {
  case 1: // Divisor = 1 -> do nothing
    store(R1, base(R10), offset(R0));
    break;
  case 2: // Divisor = 2 -> shift right by 1bit
    shiftR(R1, R1, #1);
    store(R1, base(R10), offset(R0));
    break;
  case 4: // Divisor = 4 -> shift right by 2 bits
    shiftR(R1, R1, #2);
    store(R1, base(R10), offset(R0));
  . . .

default:
    load(R2, (Tbl[i]));
    div(R1, R1, R2);
    store(R1, base(R10), offset(R0));
    break;
  }
} add(R8, R8, 1); // Increment loop counter for 1,000,000 times
jmplt(R8, 1000000, L1);
```
---- 16b

```
mov(operand0, operand1) {
  unsigned mnemonic = 0x01;
  unsigned op0 = operand0;
  unsigned op1 = operand1;
  write((mnemonic<<24) + (op0<<16) + (op1<<8));
}
```

```
unsigned MachineCodeEmitter
(nm, oplist) {
  unsigned mnemonic;                                    ---T5
  unsigned op0, op1, op2;

switch(nm) {
    case "mov"  : mnemonic = 0x01000000; break;         ---T6
    case "load" : mnemonic = 0x10000000; break;
    . . . .
  } switch(nm) {
    case "mov":
      op0 = oplist[0]<<16;
      op1 = oplist[1]<<8;
      op2 = 0;
      break;
    case "load":                                        ---T7
      op0 = oplist[0] << 16;
      op1 = oplist[1] << 8;
      op2 = oplist[2];
      break;
    . . . .
  } return mnemonic | op0 | op1 | op2;                    ---T8
}
```

43

```
#define mov(OP0, OP1) { ¥
  nm = "mov"; ¥
  oplist = {OP0, OP1}; ¥
  write(MachineCodeEmitter(nm, oplist)); ¥
}
```
45

FIG. 16

STR SRC register, [address register], immediate value
51

STR SRC register, [address register, immediate value]!
52

FIG. 17A

<INSTRUCTION INFORMATION 33 IN
ACCORDANCE WITH FIRST EMBODIMENT>

| MNEMONIC | NUMBER OF OPERANDS |
|---|---|
| mov | 2 |
| load | 3 |
| shiftR | 3 |
| STRpost | 3 |
| STRpre | 3 |
| ⋮ | ⋮ |

FIG. 17B

<MNEMONIC FUNCTION STRpost
CORRESPONDING TO INSTRUCTION 51>

```
STRpost(Operand OP0, Operand OP1, Operand OP2) {
  nm = "STRpost";
  oplist = {OP0, OP1, OP2};
  write(MachineCodeEmitter(nm, oplist));
}
```

<MNEMONIC FUNCTION STRpre
CORRESPONDING TO INSTRUCTION 52>

```
STRpre(Operand OP0, Operand OP1, Operand OP2) {
  nm = "STRpre";
  oplilst = {OP0, OP1, OP2};
  write(MachineCodeEmitter(nm, oplist));
}
```

FIG. 18

<INSTRUCTION INFORMATION 33 IN
ACCORDANCE WITH SECOND EMBODIMENT>

| FUNCTION NAME | MNEMONIC | NUMBER OF OPERANDS | TYPES OF OPERANDS |
|---|---|---|---|
| mov | mov | 2 | {Register type, Immediate type} |
| load | load | 2 | {AddrReg type, Immediate type} |
| shiftR | shiftR | 3 | {Register type, Register type, Immediate type} |
| STR | STRpost | 2 | {Register type, PostIncAddrReg type} |
| STR | STRpre | 2 | {Register type, PreIncAddrReg type} |
| ... | ... | ... | ... |

FIG. 19A

<Register_type>
```
class Reg {
  public:
    unsigned int regIndex;
}
```

FIG. 19B

<AddrReg_type>
```
class AddrReg {
  public:
    unsigned int regIndex;
    int imm_value = 0;
}
```

FIG. 19C

<PostIncAddrReg_type>
```
class PostIncAddrReg {
  public:
    unsigned int regIndex;
    int imm_value;
}
```

FIG. 19D

<PreIncAddrReg_type>
```
class PreIncAddrReg {
  public:
    unsigned int regIndex;
    int imm_valuie;
}
```

FIG. 19E

<Immediate_type>
```
class Imm {
  public:
    int imm_value;
}
```

FIG. 20A

<MNEMONIC FUNCTION STR CORRESPONDING TO MNEMONIC "STRpost">

```
void STR(Reg OP0,PostIncAddrReg OP1_2) {
  nm = "STRpost";
  Operand op0, op1, op2;
  op0.type = REGISTER;
  op0.value = OP0.regIndex;
  op1.type = REGISTER;
  op1.value = OP1_2.regIndex;
  op2.type = IMMEDIATE_VALUE;
  op2.value = OP1_2.imm_value;
  oplist = {op0, op1, op2};
  write(MachineCodeEmitter(nm, oplist));
}
```

FIG. 20B

<MNEMONIC FUNCTION STR CORRESPONDING TO MNEMONIC "STRpre">

```
void STR(Reg OP0,PreIncAddrReg OP1_2) {
  nm = "STRpre";
  Operand op0, op1, op2;
  op0.type = REGISTER;
  op0.value = OP0.regIndex;
  op1.type = REGISTER;
  op1.value = OP1_2.regIndex;
  op2.type = IMMEDIATE_VALUE;
  op2.value = OP1_2.imm_value;
  oplist = {op0, op1, op2};
  write(MachineCodeEmitter(nm, oplist));
}
```

FIG. 21A

<MNEMONIC FUNCTION mov WHEN ARGUMENTS ARE OF Operand TYPE>

```
mov(Operand OP0,Operand OP1) {
  nm = "mov";
  oplist = {OP0, OP1};
  write(MachineCodeEmitter(nm, oplist));
}
```

<PSEUDO SOURCE CODE FOR APPLICATION PROGRAM>

```
Operand OP0, OP1;
OP0.type = REGISTER;
OP0.value = 0;
OP1.type = IMMEDIATE_VLAUE;
OP1.value = 5;

// Correct coding
mov(OP0, OP1);

// Incorrect coding, but
// compilation succeeds
mov(OP1, OP0);
```

<MNEMONIC FUNCTION mov GENERATED
IN SECOND EMBODIMENT>

```
mov(Reg OP0,Imm OP1) {
  nm = "mov";
  Operand op0, op1;
  op0.type = REGISTER;
  op0.value = OP0.regIndex;
  op1.type = IMMEDIATE_VALUE;
  op1.value = OP1.imm_value;
  oplist = {op0, op1};
  write(MachineCodeEmitter(nm, oplist));
}
```

<PSEUDO SOURCE CODE
FOR APPLICATION PROGRAM>

```
Register reg;
Immediate imm;
reg.regIndex = 0;
imm.value = 5;

// Correct coding
mov(reg, imm);

// Incorrect types of arguments,
   and compilation fails
mov(imm, reg);
```

<MNEMONIC FUNCTION move
GENERATED ACCORDING TO SECOND EMBODIMENT>

```
mov(Reg OP0,Imm OP1) {
  nm = "mov";
  Operand op0, op1;
  op0.type = REGISTER;
  op0.value = OP0.regIndex;
  op1.type = IMMEDIATE_VALUE;
  op1.value = OP1.imm_value;

oplist = {op0, op1};
  write(MachineCodeEmitter(nm, oplist));
}
```

<PSEUD SOURCE CODE FOR
APPLICATION PROGRAM>

```
Register reg;
Immediate imm;
reg.regIndex = 0;
imm.value = -1000000; // Code with no problems
                     //  in C++ syntax mov(reg, imm);
```

<INSTRUCTION INFORMATION 33 IN ACCORDANCE WITH THIRD EMBODIMENT>

| FUNC-TION NAME | MNE-MONIC | NUMBER OF OPER-ANDS | TYPES OF OPERANDS | RESTRICTIONS IMPOSED ON OPERANDS |
|---|---|---|---|---|
| mov | mov | 2 | {Register type, Immediate type} | {Range of index of register is 0 to 31, Range of immediate value is -256 to +255} |
| shiftR | shiftR | 3 | {Register type, Register type, Immediate type} | {Range of index of register is 0 to 31, Range of index of register is 0 to 31, Range of immediate value is -63 to +63} |
| ... | ... | ... | ... | ... |

FIG. 26

<MNEMONIC FUNCTION mov IN
ACCORDANCE WITH THIRD EMBODIMENT>

```
void mov(Reg OP0, Imm OP1) {       ── T11
    nm = "mov";                    ── T12
    operand op0, op1;              ── T13
    if(OP0.regIndex < 0 || 31 <OP0.regIndex) {
        throw std::string("Invalid register index is passed to mov mnemonic function.");
    }                                                                                    ── T16
    if(OP1.value < -256 || 255 < OP1.value) {
        throw std::string("Invalid immediate value is passed to mov mnemonic function.");
    }
    op0.type = REGISTER;
    op0.value = OP0.regIndex;
    op1.type = IMMEDIATE_VALUE;    ── T14
    op1.value = OP1.imm_value;
    oplist = {op0, op1};
    write(MachineCodeEmitter(nm, oplist));  ── T15
}
```

<PSEUDO SOURCE CODE FOR
APPLICATION PROGRAM>

```
int main() {

. . . .
 Reg reg0;
 Imm imm0;
 reg0.regIndex = 0;
 imm0.value = 1000000;
 . . . .

try {
  mov(reg0, imm0);
  . . . .
 } catch (std::string *msg) {
  std::cout << msg << std::endl;
  std::cout << "Program exited." << std::endl;
  exit(1);
 }
}
```

41

FIG. 29A add DST register, SRC register, SRC register

FIG. 29B add DST register, SRC register, immediate value

FIG. 30

<INSTRUCTION INFORMATION 33 IN
ACCORDANCE WITH FOURTH EMBODIMENT>

| FUNC-TION NAME | MNE-MONIC | NUMBER OF OPER-ANDS | TYPES OF OPERANDS | RESTRICTIONS IMPOSED ON OPERANDS |
|---|---|---|---|---|
| ADD | add | 3 | {Register type, Register type, Register type} | {Range of index of register is 0 to 31, Range of index of register is 0 to 31, Range of index of register is 0 to 31} |
| ADD | add | 3 | {Register type, Register type, Immediate type} | {Range of index of register is 0 to 31, Range of index of register is 0 to 31, Range of immediate value is -1024 to +1023} |
| SUB | sub | 3 | {Register type, Register type, Register type} | {Range of index of register is 0 to 31, Range of index of register is 0 to 31, Range of index of register is 0 to 31} |
| MUL | mul | 3 | {Register type, Register type, Register type} | {Range of index of register is 0 to 31, Range of index of register is 0 to 31, Range of index of register is 0 to 31} |
| ... | ... | ... | ... | ... |

FIG. 31

<PSEUDO SOURCE CODE FOR MNEMONIC FUNCTION ADD>

```
mnemonic.h

⋮         T11
void ADD(Reg OP0, Reg OP1, Imm OP2) {  ←——— LINE 20
  SET();        ----T17  ←——————————————— LINE 21
  nm = "add";   --------T12
  operand op0, op1, op2;  --------T13           T16 if(OP0.regIndex < 0 || 31 <OP0.regIndex) {
    throw std::string
    ("Invalid register index of OP0 is passed to add mnemonic function.");
  }
  if(OP1.regIndex < 0 || 31 <OP1.regIndex) {
    throw std::string
    ("Invalid register index of OP1 is passed to add mnemonic function.");
  }
  if(OP2.value < -1024 || 1023 < OP2.value) {
    throw std::string
    ("Invalid immediate value of OP2 is passed to add mnemonic function.");
  } op0.type = REGISTER;
  op0.value = OP0.regIndex;
  op1.type = REGISTER;
  op1.value = OP1.regIndex;         ------T14
  op2.type = IMMEDIATE_VALUE;
  op2.value = OP2.imm_value;
  oplist = {op0, op1, op2};
  write(MachineCodeEmitter(nm, oplist));  ------T15
}
                    ⋮
```

<PSEUDO SOURCE CODE FOR FUNCTION SET()> mnemonic.h

...

define SET() setCodeInfo(__FILE__, __LINE__, __func__)  ---T20 char g_filename[128];
char g_funcname[128];     ---T21
int g_line;

void setCodeInfo(char *filename, int line, char *funcname){   ---T22
  strcpy(g_filename, filename);
  g_line = line;
  srtcpy(g_funcname, funcname);
}

<PSEUDO SOURCE CODE FOR APPLICATION PROGRAM>

```
sample.cpp void func0() {

. . . .

Reg reg0;
 Reg reg1;          ----T25
 Imm imm0;

reg0.regIndex = 0;
 reg1.regIndex = 1;  ----T26
 imm0.value = 100000;

. . . .
                T27
 try {
  ADD(reg0, reg1, imm0);   ←——LINE 101
  . . . .                                        T28
 } catch (std::string *msg) {
  std::cout << msg << std::endl;
  std::cout << "file name:" << g_filename
            << ",line:" << g_line ",function name:" << g_funcname
  std::cout << "Program exited." << std::endl;
  exit(1);
 }
}
```

Invalid immediate value of OP2 is passed to add mnemonic function.
file name:mnemonic.h, line:21, function name:ADD      74
Program exited.                                        75

FIG. 36

<PSEUDO SOURCE CODE FOR MNEMONIC FUNCTION ADD>

```
                                    mnemonic.h

⋮                T18              LINE 20
   void ADD(const std::string &strFile, const size_t line, string &strFunc,
                                          Reg OP0, Reg OP1, Imm OP2) {
      SET():      ----T17
      nm = "add";  -------T12              T11
      operand op0, op1, op2;  -------T13                              T16 if(OP0.regIndex < 0 || 31 <OP0.regIndex) {
         throw std::string
         ("Invalid register index of OP0 is passed to add mnemonic function.");
      }
      if(OP1.regIndex < 0 || 31 <OP1.regIndex) {
         throw std::string
         ("Invalid register index of OP1 is passed to add mnemonic function.");
      }
      if(OP2.value < -1024 || 1023 < OP2.value) {
         throw std::string
         ("Invalid immediate value of OP2 is passed to add mnemonic function.");
      } op0.type = REGISTER;
      op0.value = OP0.regIndex;
      op1.type = REGISTER;
      op1.value = OP1.regIndex;             ------T14
      op2.type = IMMEDIATE_VALUE;
      op2.value = OP2.imm_value;
      oplist = {op0, op1, op2};
      write(MachineCodeEmitter(nm, oplist));  ------T15
   }
                                   ⋮
```

FIG. 37

<PSEUDO SOURCE CODE FOR FUNCTION SET()> mnemonic.h

...

define SET() setCodeInfo(string &strFile, size_t line, string &strFunc)  — T20 char g_filename[128];
char g_funcname[128];  — T21
int g_line;

void setCodeInfo(char *filename, int line, char *funcname){
strcpy(g_filename, filename);
g_line = line;
srtcpy(g_funcname, funcname);
}  — T22

<PSEUDO SOURCE CODE FOR DEFINITION FILE>

```
define.h
#define add(...) ADD(__FILE__, __LINE__, __func__, __VA_ARGS__)
#define sub(...) SUB(__FILE__, __LINE__, __func__, __VA_ARGS__)
#define mul(...) MUL(__FILE__, __LINE__, __func__, __VA_ARGS__)
...
```
82

FIG. 39

<PSEUDO SOURCE CODE FOR APPLICATION
PROGRAM IN FOURTH EMBODIMENT>

```
sample.cpp void func0() {

. . .

Reg reg0;
  Reg reg1;         ----T25
  Imm imm0;

reg0.regIndex = 0;
  reg1.regIndex = 1;   ----T26
  imm0.value = 100000;

. . .
                T27
  try {
    add(reg0, reg1, imm0);    <----LINE 101
    . . .                                      T28
  } catch (std::string *msg) {
    std::cout << msg << std::endl;
    std::cout << "file name:" << g_filename
            << ",line:" << g_line ",function name:" << g_funcname
    std::cout << "Program exited." << std::endl;
    exit(1);
  }
}
```

Invalid immediate value of OP2 is passed to add mnemonic function.
file name:sample.cpp, line:101, function name:func0      84
Program exited.
                                                         85

FIG. 42

<PSEUDO SOURCE CODE FOR SOURCE FILE IN
ACCORDANCE WITH ANOTHER EXAMPLE OF
FOURTH EMBODIMENT>

```
void jit_function() {
  ADD(__FILE__, __LINE__,__func__, w0, w0, 128);
  ADD(__FILE__, __LINE__, __func__, w1, w1, 10000);
  ADD(__FILE__, __LINE__, __func__, w0, w0, w1);
  ret(__FILE__, __LINE__, __func__);
}
```

41

NON-TRANSITORY COMPUTER-READABLE RECORDING MEDIUM, FUNCTION GENERATION METHOD, AND INFORMATION PROCESSING DEVICE

CROSS-REFERENCE TO RELATED APPLICATION

This application is a continuation application of International Patent Application No. PCT/JP2020/000184, filed on Jan. 7, 2020, the entire contents of which are incorporated herein by reference.

FIELD

A certain aspect of embodiments described herein relates to a non-transitory computer-readable recording medium, a function generation method, and an information processing device.

BACKGROUND

Just in time (JIT) compiler technology is one of the technologies that increase the execution speed of programs. The JIT compiler technology is a technology that generates a suitable machine-language instruction sequence according to the parameters determined at run-time, the processing details, and processor conditions. A machine-language instruction sequence generated using the JIT compiler technology is processed faster than an executable file composed of a universally processable machine-language instruction sequence generated by an ahead of time (AOT) type compiler.

However, to use JIT compiler technology, for each instruction included in an instruction set, the developer must manually write, in source code, a function that generates the machine language to execute that instruction. Therefore, the man-hours required to generate these functions and to test whether each function generates correct machine language are enormous. Note that the technique related to the present disclosure is also disclosed in Japanese Laid-Open Patent Publication No. 2000-56981.

SUMMARY

According to an aspect of the embodiments, there is provided a non-transitory computer-readable recording medium storing a function generation program that causes a computer to execute a process, the process including: referring to a storage unit that stores instruction information about an instruction to generate a first function that corresponds to the instruction and receives one or more arguments representing one or more operands of the instruction; generating first code inside the first function, where the first code calls a second function that returns machine language representing a process executed by the instruction for the one or more operands represented by the one or more arguments; and generating second code inside the first function, where the second code writes the machine language in a memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 schematically illustrates pseudo code in an assembly obtained using the AOT compiler technology.

FIG. 5 illustrates C++ pseudo source code for an executable program using JIT compiler technology.

FIG. 8 illustrates pseudo source code for a mnemonic function corresponding to a mov instruction.

FIG. 10 illustrates a source file in which C++ pseudo source code for a MachineCodeEmitter function is written.

FIG. 16 illustrates instructions having the same mnemonic but different machine language.

FIG. 17A schematically illustrates instruction information of the first embodiment when mnemonics "STRpost" and "STRpre" are employed, and FIG. 17B illustrates the mnemonic function generated, according to the first embodiment, based on the instruction information.

FIG. 18 schematically illustrates instruction information used in a second embodiment.

FIG. 19A to FIG. 19E illustrate examples of C++ pseudo source code that defines a type of an operand in the second embodiment.

FIG. 20A schematically illustrates a source file in which C++ pseudo source code for a mnemonic function STR in accordance with the second embodiment, corresponding to the mnemonic "STRpost" is written, and FIG. 20B schematically illustrates a source file in which C++ pseudo source code for another mnemonic function STR in accordance with the second embodiment, corresponding to the mnemonic "STRpre" is written.

FIG. 21A illustrates C++ pseudo source code for the mnemonic function mov when the argument of the mnemonic function is of an Operand type, and FIG. 21B illustrates C++ pseudo source code in a source file 41 for an application program written by a developer using this mnemonic function mov.

FIG. 22A schematically illustrates a source file in which C++ pseudo source code for a mnemonic function mov generated in the second embodiment is written, and FIG. 22B illustrates C++ pseudo source code in a source file for the application program written by the developer using this mnemonic function mov.

FIG. 24A illustrates a source file in which C++ source code for the mnemonic function mov generated according to the second embodiment is written, and FIG. 24B illustrates C++ pseudo source code in a source file for the application software written by the developer using this mnemonic function mov.

FIG. 25 schematically illustrates instruction information used in a third embodiment.

FIG. 26 schematically illustrates C++ pseudo source code in a source file 34 in which a mnemonic function mov in accordance with the third embodiment, corresponding to the mov instruction is written.

FIG. 27 illustrates C++ pseudo source code in a source file for the application program written by the developer using the mnemonic function mov in accordance with the third embodiment.

FIG. 29A and FIG. 29B illustrate the syntax of an add instruction in a fourth embodiment.

FIG. 30 schematically illustrates instruction information in accordance with the fourth embodiment.

FIG. 31 illustrates source code for a mnemonic function ADD generated by a control unit according to the fourth embodiment.

FIG. 32 schematically illustrates C++ pseudo source code that defines a function "SET( )".

FIG. 33 schematically illustrates pseudo source code in a source file for the application program written in C++ by the developer in the fourth embodiment.

FIG. 34 illustrates an example output.

FIG. 36 schematically illustrates C++ pseudo source code for the mnemonic function ADD generated by the control unit in the fourth embodiment.

FIG. 37 illustrates C++ pseudo source code for the function "SET( )" generated by a fourth generating unit in the fourth embodiment.

FIG. 38 schematically illustrates pseudo source code in a definition file generated by a definition file generating unit in the fourth embodiment.

FIG. 39 illustrates C++ pseudo code in a source file for the application computer written by the developer in the fourth embodiment.

FIG. 41 illustrates an example output in the fourth embodiment.

FIG. 42 schematically illustrates C++ pseudo source code in a source file in accordance with another example of the fourth embodiment.

DESCRIPTION OF EMBODIMENTS

Prior to the description of embodiments, what the inventor studied will be described.

As described above, the JIT compiler technology is useful to increase the execution speed of programs. Such advantages of the JIT compiler technology will be described in comparison with the ahead of time (AOT) compiler technology. This JIT compiler technology is not a technology that converts, at run-time, processor-independent intermediate language code into a machine-language instruction sequence that can be directly handled by a processor, but a compiler technology that generates a machine-language instruction sequence suitable for parameters and the like determined at run-time.

Figure 1:
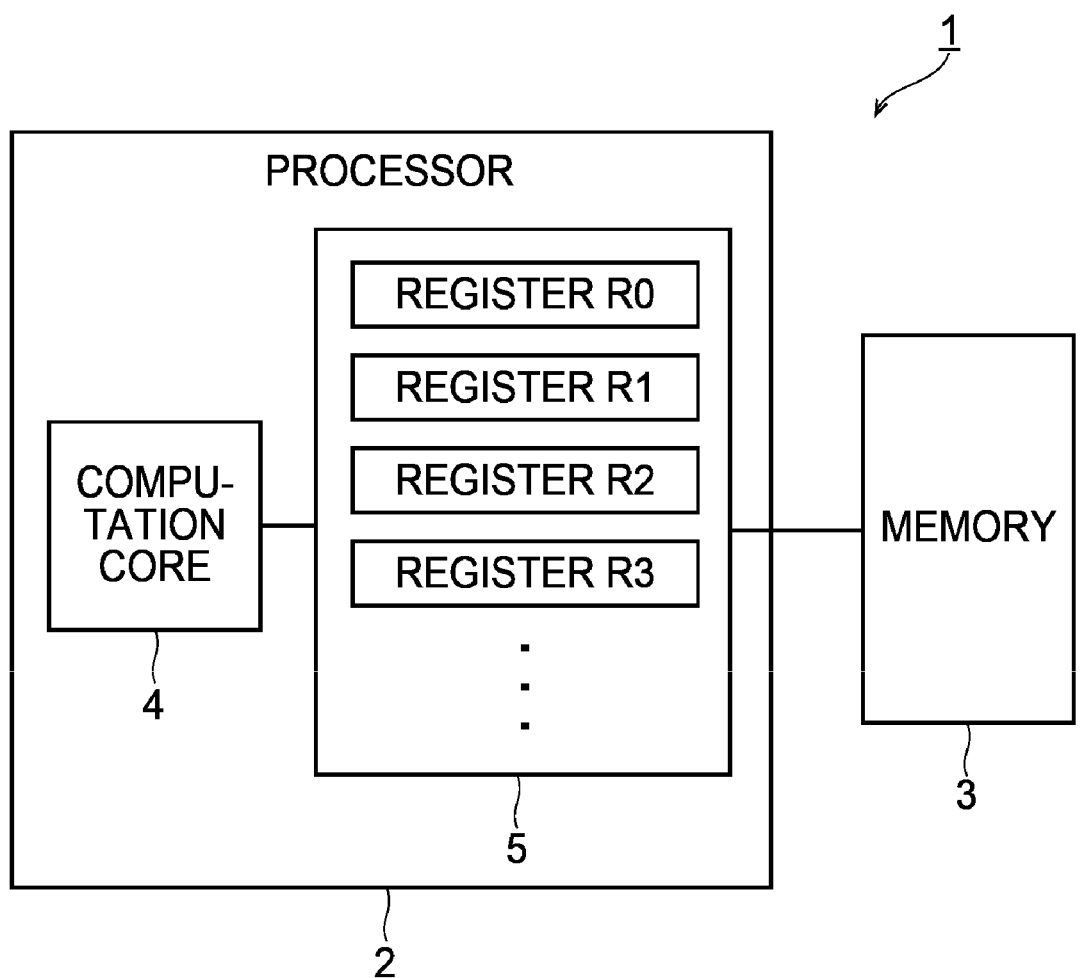
FIG. 1 is a hardware configuration diagram of a target machine on which an executable program is to be executed.

FIG. 1 is a hardware configuration diagram of a target machine on which an executable program generated using the AOT compiler technology or the JIT compiler technology is to be executed.

A target machine 1 is a computing machine such as a server or a personal computer (PC), and includes a processor 2 and a memory 3.

The processor 2 includes a computation core 4 such as an arithmetic and logic unit (ALU), which performs arithmetic and logical operations, and a register file 5. The register file 5 is hardware including a plurality of general-purpose registers Rn identified by an index n (=0, 1, 2, . . . ).

The memory 3 is a volatile memory such as a dynamic random access memory (DRAM) to which an executable program is loaded. The executable program can be generated by compiling source code using the AOT compiler technology as described below. Alternatively, the executable program may be dynamically generated during the execution of the machine-language instruction sequence called by the executable program using the JIT compiler technology.

Figure 2A:
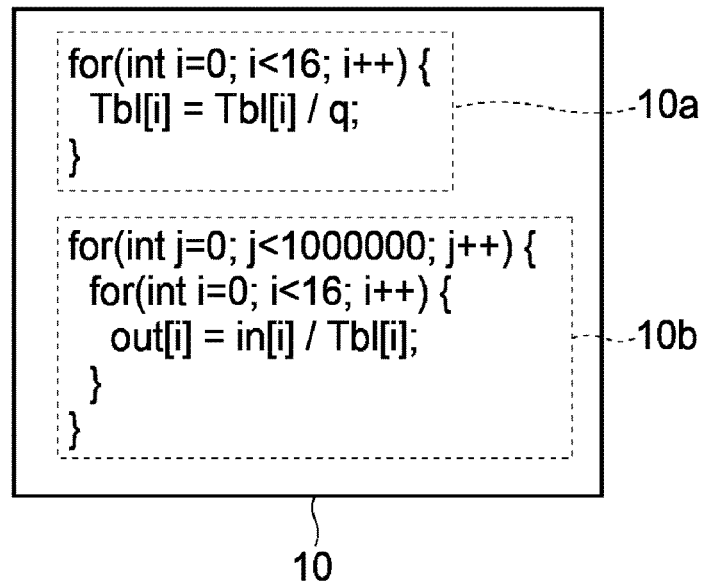
FIG. 2A illustrates C++ pseudo source code that is assumed to be compiled using ahead of time (AOT) compiler technology.

FIG. 2A illustrates C++ pseudo source code 10 that is assumed to be compiled using the AOT compiler technology.

In the AOT compiler technology, the developer writes source code according to the syntax of C language or C++, and a compiler such as a GNU compiler collection (GCC) or other compilers compiles the source code into a machine-language instruction sequence.

In the example of FIG. 2A, in a process 10a, each element of the array "Tbl" is divided by the parameter "q". Then, in a process 10b, the elements of the array "in" are divided by the elements of the array "Tbl", respectively, and the resulting elements are stored in the array "out".

Figure 2B:
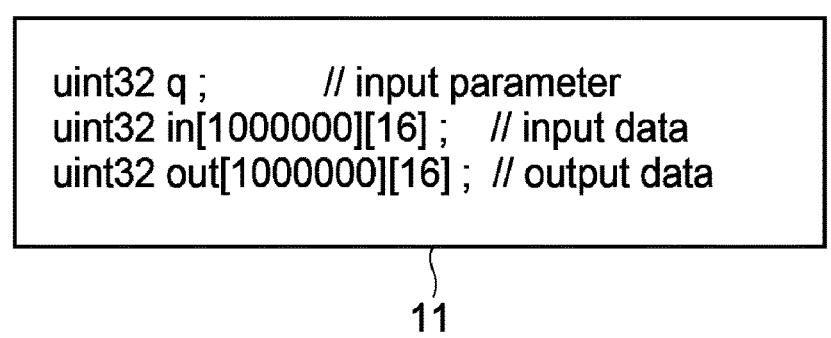
FIG. 2B illustrates C++ source code that declares a parameter q and arrays in and out.

FIG. 2B illustrates C++ pseudo source code 11 that declares the parameter "q" and the arrays "in" and "out".

The parameter "q" is a divisor in the aforementioned process 10a, and hereinafter, will be also referred as an input parameter. The array "in" and the array "out" are input data and output data in the process 10b, respectively. Data to be stored in these arrays "in" and "out" are not particularly limited. Here, the array "in" and the array "out" are declared as two-dimensional arrays that store 1000000 images each being composed of 16 pixel data.

Figure 2C:
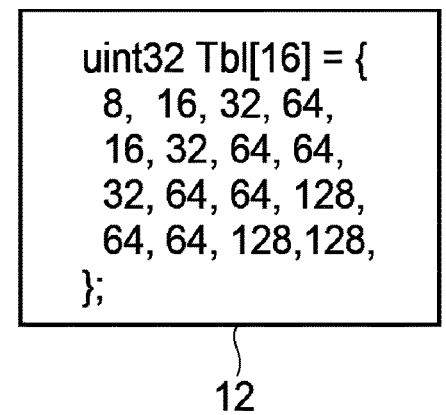
FIG. 2C illustrates C++ pseudo source code that declares initial values of an array Tbl.

FIG. 2C illustrates C++ pseudo source code 12 that declares the initial value of the array Tbl.

The array "Tbl" is an array that stores values of a quantization table that quantizes pixel data. Here, the array "Tbl" is declared as an array having 16 elements corresponding to each of the arrays "in" and "out". The initial value of each element of the array "Tbl" is assumed to be power-of-two.

The source code 10 to the source code 12 in FIG. 2A to FIG. 2C are all written by the developer according to the syntax of C language or C++, and are to be compiled into an assembly by a compiler.

FIG. 3 schematically illustrates pseudo code in an assembly 14 obtained by compiling the aforementioned source code 10 using the AOT compiler technology.

In the assembly 14, multiple instructions included in the instruction set of the processor 2 are generated for each of the processes 10a and 10b.

For example, the process 10a is implemented by 6 instructions from a mov instruction to a jmplt instruction, and the process 10b is implemented by 10 instructions from a mov instruction to a jmplt instruction. These instructions are instructions included in the instruction set of the processor 2, and perform various operations on the registers and the memory written as operands. Here, the register is represented by Rn (n=0, 1, 2, . . . ) as in FIG. 1, and a label indicating the position of the instruction is represented by Lm (m=0, 1, 2, . . . ). It is assumed that the input parameter "q" is first stored in the register R2.

Every instruction included in the instruction set is uniquely identified by a name called a mnemonic. For example, the mnemonic of the mov instruction is "mov", and the mnemonic of the store instruction is "store".

In the assembly 14, the syntax in which operands are written after the mnemonic of the instruction is employed. For example, "mov R0, #0" is an instruction to store the immediate value "0" in the register R0. Additionally, "load R1, [Tbl[R0]]" is an instruction to load the value of the a-th element (a is the content of the register R0) of the array "Tbl" of which the values are retained in the memory 3 into the register R1.

Meanwhile, "store [Tbl[R0]], R1" is an instruction to store the content of the register R1 in the b-th element (b is the content of the register R0) of the array "Tbl" of which the values are retained in the memory 3. Additionally, "div R1, R1, R2" is an instruction to divide the content of the register R1 by the content of the register R2 and then store the resulting value in the register R1. Lastly, "Jmplt R0, #16, L0" is an instruction to jump to the label L0 when the content of the register R0 is less than the immediate value "16".

Here, the instruction "div R2, R2, R1" in the process 10b will be discussed. This instruction corresponds to "in[i]/Tbl[i]" in the process 10b of the source code 10. The divisor "Tbl[i]" is divided by the input parameter "q" in the process 10a of the source code 10. The above instruction "div R2, R2, R1" is an instruction that gives the correct result of the division regardless of the value of the input parameter "q". Therefore, the assembly 14 is generic code that gives the correct result for any input parameter "q".

However, the instruction to perform division, such as a div instruction, is an instruction that has a higher number of execution cycles than other instructions in any type of processor. Therefore, the throughput from the start of execution until the result is obtained is large, and this instruction may decrease the processing performance. Depending on the type of the processor 2, the number of execution cycles of numerical instructions other than the div instruction is 1 to 5, while the number of execution cycles of the div instruction may be as high as approximately 80. Furthermore, in deep learning and image processing, the number of loops of a for loop is enormous. Therefore, decrease in throughput is further noticeable due to the div instruction inside the for loop.

The assembler translates such an assembly 14 into a machine-language instruction sequence, generating an executable program composed of machine language. Some compilers, such as LLVM, may generate an assembly for the processor having a virtual instruction set, regardless of the type of the processor 2. In this case, this assembly may be converted into machine-language instruction sequences for individual processors, but it is the same as the above that the throughput decreases if the division instruction, such as a div instruction, is present.

Figure 4:
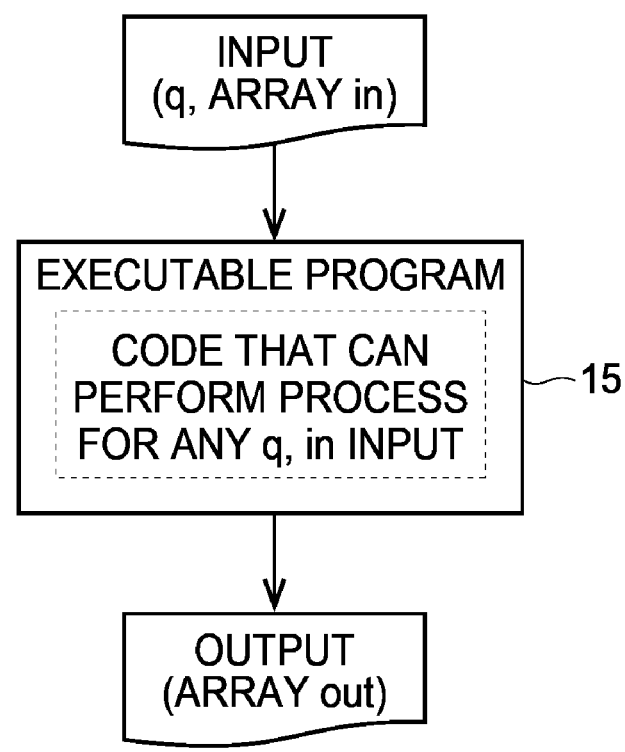
FIG. 4 schematically illustrates the behavior of an executable program obtained using the AOT compiler technology.

FIG. 4 schematically illustrates the behavior of an executable program obtained using the AOT compiler technology.

As illustrated in FIG. 4, an executable program 15 receives each element of the array "in", which is input data, and the input of the input parameter "q". Then, regardless of the input parameter "q" and the values of the array "in", the executable program performs processing according to the machine-language instruction sequence obtained from the same assembly 14, and stores the processing results in respective elements of the array "out".

Next, a description will be given of a program on the premise of the JIT compiler technology, which can reduce throughput degradation.

FIG. 5 illustrates C++ pseudo source code 16 for an executable program using the JIT compiler technology.

This source code 16 is code written by the developer so that the execution result of the source code 16 is the same as the execution result of the source code 10 in FIG. 2A, and includes a process 16a and a process 16b. The process 16a is a process of dividing each element of the array "Tbl" by the parameter "q" as in the process 10a of the source code 10. The process 16b is a process of dividing the elements of the array "in" by the elements of the array "Tbl", respectively and storing the results in the array "out" as in the process 10b of the source code 10.

In the process 16b, functions, such as "mov(R0, i)", having the same name as the mnemonic are written by the developer. The function "mov(R0, i)" is a function corresponding to the assembly "mov R0, #i", and is a function that writes the machine language representing the process executed by "mov R0, #i" in the memory 3. It is impossible to write variables in the assembly, and only fixed values, such as "mov R0, #5" and "mov R0, #-128", can be specified at the time of the assembly. When the JIT compiler technology is used, the variable i can be used for the immediate value. This is one of the advantages of the JIT compiler technology. The function that has the same function name as the mnemonic of an instruction and writes the machine language representing the process to be executed by the instruction in the memory 3 will be referred to as a mnemonic function, hereinafter.

The process 16b is a description that executes a process of writing the machine-language instruction sequence executing in[i]/Tbl[i] for i=0 to 15, in the memory 3. In this example, since the developer writes a switch statement, a machine-language instruction sequence is generated using different mnemonic functions depending on the value of the array element "Tbl[i]", which is the divisor.

For example, when the value of "Tbl[i]" is "1", the divisor for "in[i]" is "1". Therefore, nothing is required to be done to "in[i]". Thus, in this case, the machine language that performs an operation on the value of the register R1 in which the value of "in[i]" is stored is not generated in "case 1", and only the machine language that stores the value of in[i] in out[i] without any change is written in the memory 3.

Meanwhile, when the value of "Tbl[i]" is "2", "shiftR(R1, R1, #1)" corresponding to generation of the machine language for a shiftR instruction is executed in "case 2". This mnemonic function is a function that writes the machine language representing a process of shifting the content of the register R1 right by 1 bit, and then writing the result in the register R1, in the memory 3. Therefore, by executing "shiftR(R1, R1, #1)", the machine language that performs a process equivalent to dividing "in[i]" stored in the register R1 by 2, can be written in the memory 3.

When the value of "Tbl[i]" is "4", "shiftR(R1, R1, #2)" is executed in "case 4". This causes the content of the register R1 to be shifted right by 2 bits, and enables to write the machine language that performs a process equivalent to dividing "in[i]" stored in the register R1 by 4, in the memory 3. As described above, when the divisor is a power-of-two value, the mnemonic function corresponding to the shiftR instruction is executed.

When the value of "Tbl[i]" is not a power-of-two value such as "1", "2", "4", "div(R1, R1, R2)" is executed in "default". This mnemonic function is a function corresponding to the div instruction, and is a function that writes, in the memory 3, the machine language that writes the value obtained by dividing the content of the register R1 by the content of the register R2 in the register R1.

According to the above source code 16, when the value of "Tbl[i]" is a power-of-two value such as "1", "2", and "4", the machine language equivalent to the shiftR instruction of which the number of execution cycles is less than the div instruction, or the machine language that does nothing is written in the memory 3. When the value of "Tbl[i]" is not a power-of-two value such as "1", "2", and "4", the machine language equivalent to the div instruction is written in the memory 3.

In the JIT compiler technology, by writing optimal machine language for reducing the number of execution cycles according to the values of the parameters such as "Tbl[i]", the execution speed of programs can be increased compared to the AOT compiler technology.

Figure 6:
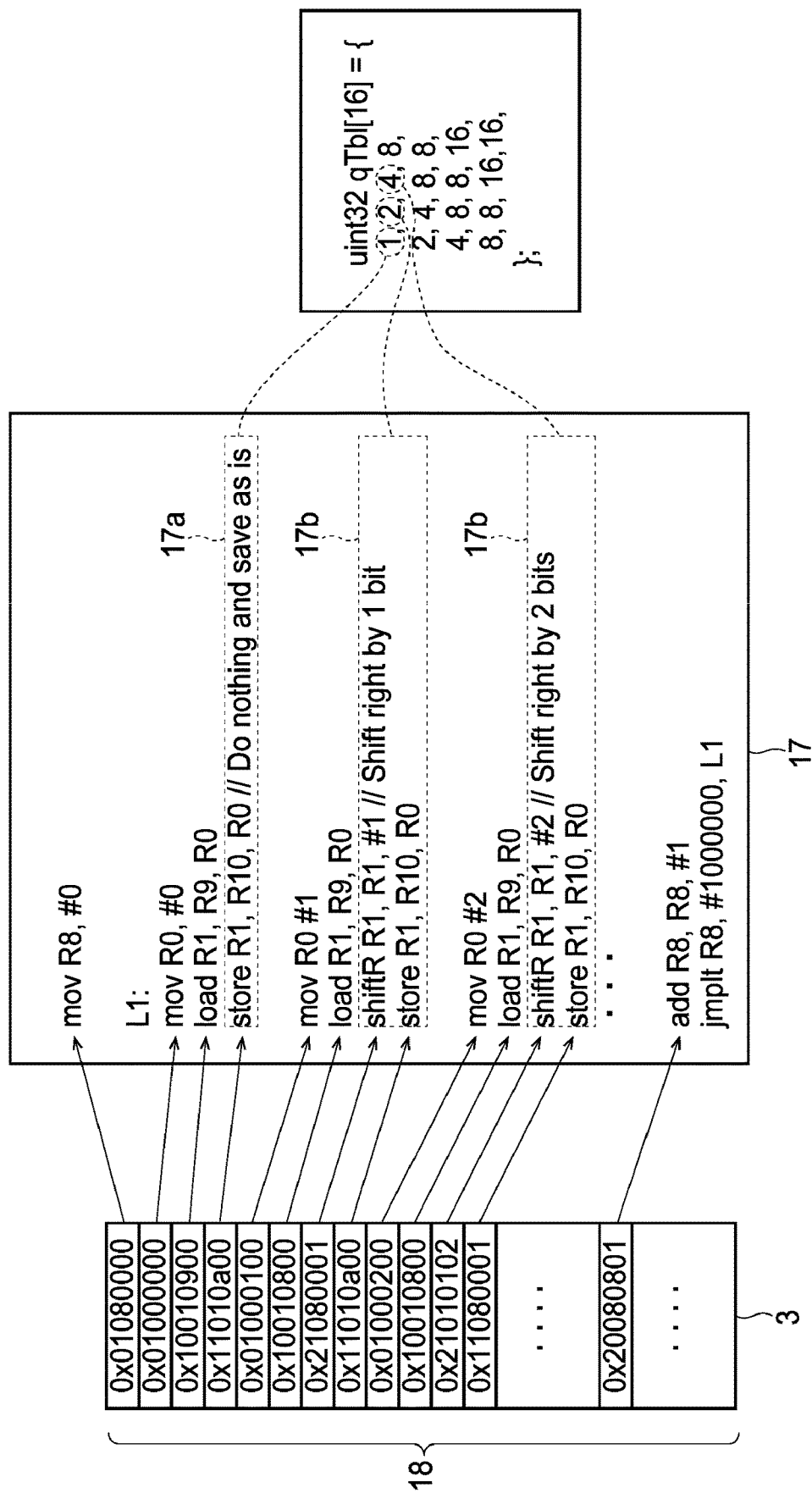
FIG. 6 schematically illustrates a machine-language instruction sequence generated using the JIT compiler technology and pseudo code obtained by disassembling the machine-language instruction sequence when the input parameter q is "8".

FIG. 6 schematically illustrates what machine-language instruction sequence the process 16b writes in the memory during the execution of the executable file obtained by compiling the source code 16. When the executable file is executed, "8" is given to the input parameter q. In FIG. 6, the pseudo code of the assembly 17 obtained by disassembling this machine-language instruction sequence is also illustrated.

As illustrated in FIG. 6, when q=8, the elements of the array "Tbl" are "1", "2", and "4" in this order from the top. Therefore, when the for loop of the process 16b is executed, machine language 18 generated by each of the shiftR functions and the store functions corresponding to respective cases: i=0 (case 1), i=1 (case 2), and i=2 (case 4) is to be stored in the memory 3. The code obtained by disassembling the machine language 18 is code 17a, 17b, and 17c in an assembly 17.

Figure 7:
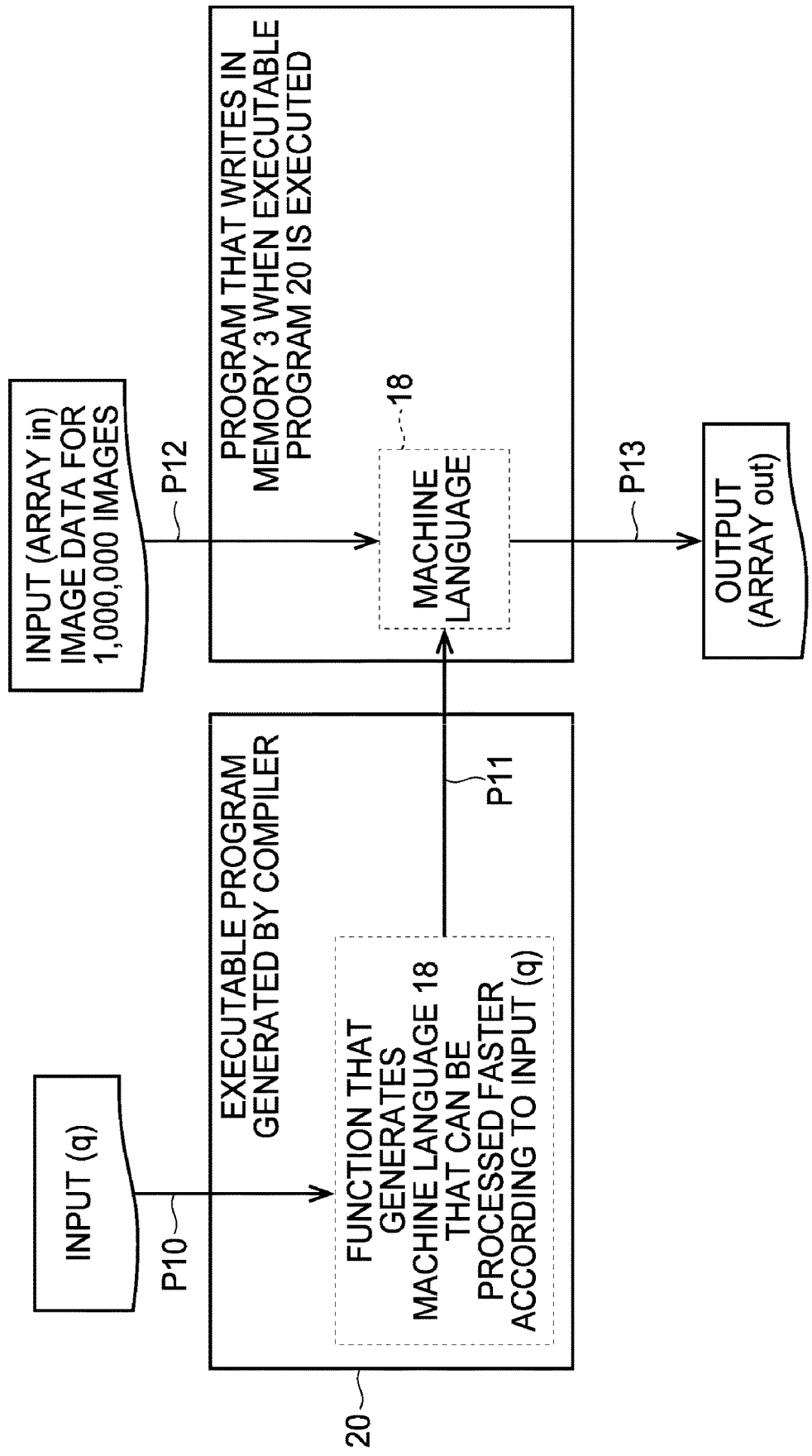
FIG. 7 schematically illustrates the behavior of an executable program that generates, at run-time, a function to be called at run-time, using the JIT compiler technology.

FIG. 7 schematically illustrates the behavior of an executable program that generates, at run-time, functions to be called at run-time using the JIT compiler technology. Here, a description will be given of the behavior of an executable program 20 obtained by compiling the source code 16 using the JIT compiler technology.

As illustrated in FIG. 7, the executable program 20 receives the input of the input parameter "q" (step P10). Then, the executable program 20 generates the machine language 18 that can be processed faster according to the value of the input parameter "q" (step P11). In the example of FIG. 6 described above, the machine language 18 suitable for the value of "Tbl[i]" is generated.

Then, the executable program 20 receives the input of the elements of the array "in", which is the input data (step P12), and stores the processing results in the respective elements of the array "out" (step P13).

Since the machine language 18 does not contain the div instruction of which the throughput is slow, faster processing than the executable program corresponding to the assembly 14 can be performed. In addition, by generating the suitable machine language 18 according to the value of the input parameter "p" as described above, the execution speed of the program can be increased in the JIT compiler technology compared to that in the AOT compiler technology.

Since the mnemonic functions used in the JIT compiler technology are functions that do not exist in the libraries of C++, C language, and other programming languages, the developer is required to manually write the mnemonic functions in advance.

FIG. 8 illustrates C++ pseudo source code for the mnemonic function corresponding to the mov instruction.

This source code 21 is source code that defines a mnemonic function mov. The function name of the mnemonic function mov is the same as the mnemonic "mov" of the mov instruction, and its arguments are "operand0" and "operand1" taken by the mov instruction.

Inside the mnemonic function mov, code that writes the machine language representing the process of the mov instruction in the memory 3 is written. Here, it is assumed that the instruction length is 32 bits, and the opcode of the mov instruction is 8 bits and "0x01". In this case, the developer writes the statement "unsigned mnemonic=0x 01;", which assigns the opcode "0x01" to the variable "mnemonic", in the body of the mnemonic function mov. Similarly, the developer writes the statement "unsigned op0=operand 0;", which assigns "operand0" to the variable "op0", and the statement "unsigned op1=operand1;", which assigns "operand1" to the variable "op1", in the body of the mnemonic function mov.

Then, the developer writes the statement "write((mnemonic<<24)+(op0<<16)+(op1<<8));" after these statements. The function write is a function that writes the bit sequence of the arguments in the memory 3. In this example, the bitwise OR of the bit sequence obtained by shifting the value of "mnemonic" left by 24 bits, the value obtained by shifting the value of the variable "op0" left by 16 bits, and the value obtained by shifting the value of the variable "op1" left by 8 bits is the argument of the function write. In this bit sequence, the first 8 bits are the opcode of the mov instruction. The next 8 bits of the opcode is the bit sequence of the variable "op0", and the next 8 bits are the bit sequence of the variable "op1". In the mnemonic function corresponding to an instruction that takes three operands such as "shiftR R1, R1, #1" in the assembly 17, the last 8 bits are the bit sequence of the third variable "op2".

To write such a mnemonic function, the developer is required to refer to the specifications for the instruction set to identify the format of each instruction, and then write the bit sequence of each of the opcode and the operand in the argument of the function write according to that format.

However, writing mnemonic functions manually in such a manner is an extremely complicated process and increases the burden on the developer. In addition, since it is required to verify manually whether the mnemonic function correctly writes the desired machine language in the memory 3, the burden on the developer further increases. In particular, some processors 2 have several hundreds to more than a thousand instructions in their instruction sets. For example, in the processor that follows the ARMv 8-A architecture profile specified by ARM, there are about 1000 types of instructions if the instructions with the same name but different operands are treated as different instructions. In this case, the developers must write about 1000 different mnemonic functions by themselves, which requires an enormous amount of man-hours to manually write and verify mnemonic functions corresponding to all instructions.

Furthermore, the instruction set may be extended in the future, and it is not worth the trouble to write and verify the mnemonic functions each time.

Hereinafter, embodiments that can reduce man-hours required to generate mnemonic functions will be described.

First Embodiment

In a first embodiment, an information processing device automatically generates mnemonic functions in the following manner.

Overall Configuration

Figure 9:
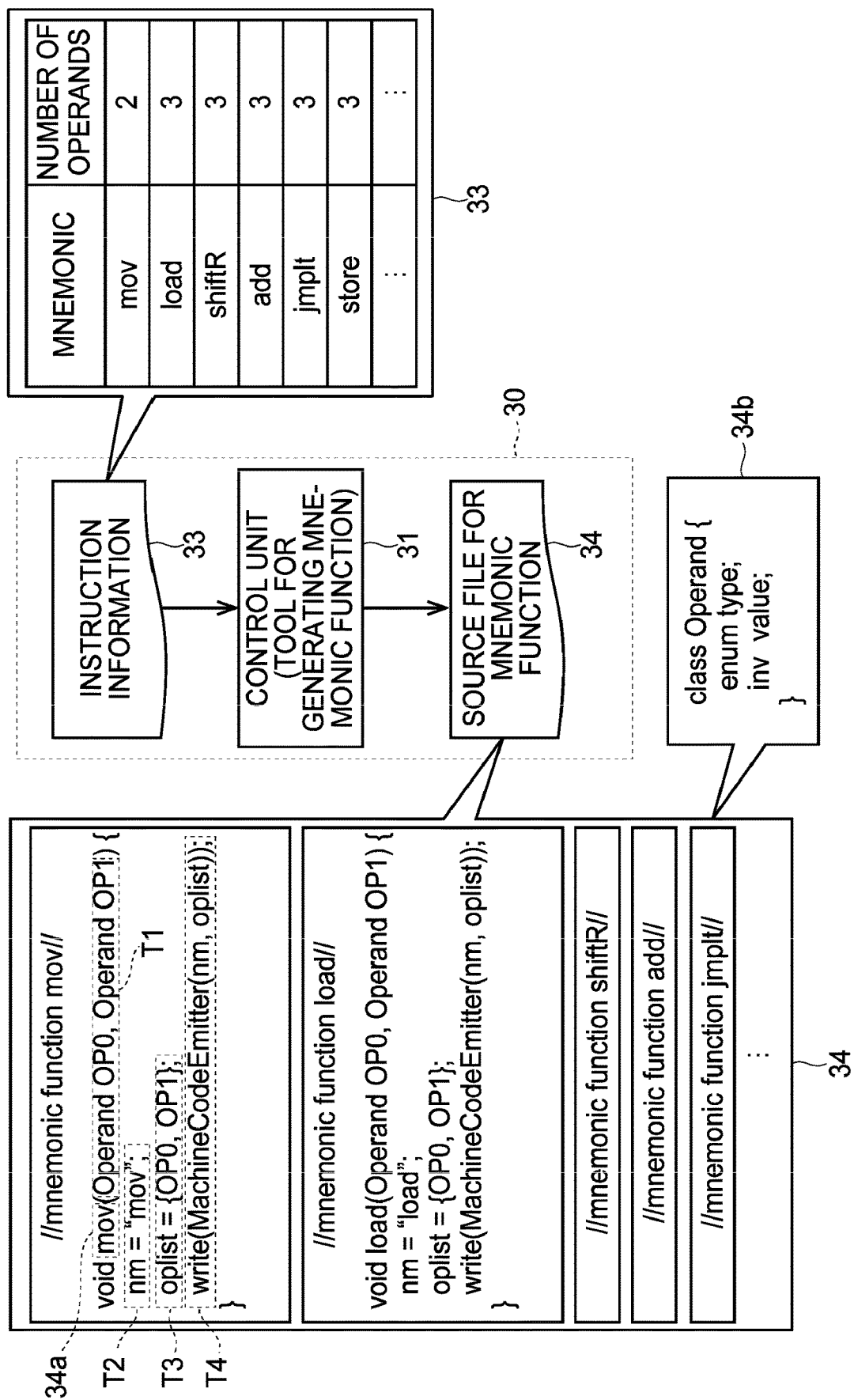
FIG. 9 schematically illustrates the operation of an information processing device in accordance with a first embodiment.

FIG. 9 schematically illustrates the operation of the information processing device in accordance with the first embodiment. An information processing device 30 is a computing device such as a PC or a server including a control unit 31 that is a tool for automatically generating mnemonic functions. In generating the mnemonic function, the control unit 31 refers to instruction information 33 for generating functions.

The instruction information 33 is information that stores the mnemonic and the number of operands of each instruction in association with each other, and is created by the developer in advance. Individual rows of the instruction information 33 correspond to different instructions. For examples, the first line corresponds to the mov instruction, and the second line corresponds to the load instruction.

In this example, the developer stores the mnemonic "mov" in the first row, which is the mnemonic of the mov instruction, in the instruction information 33 in association with the number of operands of the mov instruction "2". The number of operands varies depending on instructions. For example, in the shiftR instruction, the number of operands is "3".

The instruction information 33 is stored in a storage unit in the information processing device 30. Note that the developer may store the instruction information 33 in an external storage unit connected to the information processing device 30 via a network, and the control unit 31 may refer to the external storage unit.

The control unit 31 reads the instruction information 33 row by row, and generates a mnemonic function having a function name corresponding to the mnemonic in each row. A generation method of the mnemonic function will be described using the mnemonic "mov" in the first row as an example.

First, the control unit 31 reads the first row of the instruction information 33 to obtain the mnemonic "mov" and the number of operands "2" corresponding to the mnemonic "mov".

Then, the control unit 31 writes a mnemonic function having a function name corresponding to the mnemonic "mov" in a C++ source file 34. In the first embodiment, the function name is made to be the same name as the mnemonic. Thus, the control unit 31 writes a mnemonic function having a function name 34a of "mov" in the source file 34. The programing language to be written in the source file 34 is not limited to C++, and the control unit 31 may write C or C# source code in the source file 34.

The mnemonic function mov takes the same number of arguments as the number of operands "2" in the instruction information 33. As a result, the function "void mov(Operand OP0, Operand OP1){ }", which has empty contents and is the template for the mnemonic function mov, is written. The mnemonic function mov is an example of a first function.

"OP0" and "OP1" are arguments representing the operands of the mov instruction, respectively. Here, the control unit 31 defines the Operand type as the type of the variable representing the operand by writing source code 34b in the source file 34. Then, the control unit 31 declares "OP0" and "OP1" as the Operand type in code T1.

The Operand type is a class having "type" and "value" as the members. The kind of the operand such as a register or an immediate value is stored in "type". The immediate value or the numerical value such as the index of the register is stored in "value". The Operand type may be defined in a source file different from the source file 34.

The control unit 31 then generates code T2 to code T4 inside the mnemonic function mov.

The code T2 is a statement that assigns the function name "mov" obtained previously to the variable "nm". In this example, "mov", which is the string of characters, is assigned to the variable "nm", but the function name "mov" and an integer value may be made to correspond one-to-one with each other in advance, and the integer value may be assigned to the variable "nm".

The code T3 is a statement that assigns "OP0" and "OP1", which are of the Operand type, received as the arguments by the mnemonic function mov to the array "oplist".

The code T4 is code that calls a MachineCodeEmitter function, and code that writes the return value of the MachineCodeEmitter function in the memory 3 using the function write. The MachineCodeEmitter function is a function that receives the variable "nm" and the variable "oplist" as the arguments, and generates the machine language representing the process executed by the instruction represented by the variable "nm" for the operands represented by the variable "oplist". The MachineCodeEmitter function is an example of a second function, and is a function that is created together with the assembler of the processor 2 and of which the behavior has been verified.

Through the above process, the control unit 31 automatically generates the mnemonic function mov.

Thereafter, the control unit 31 performs the same process as above for the second and subsequent rows of the instruction information 33 to automatically generate mnemonic functions having function names "load", "shiftR", "add", and others. Then, the control unit 31 outputs the source file 34 in which the mnemonic functions corresponding to all instructions included in the instruction set of the processor 2 to a storage unit such as a memory.

This eliminates the need for the developer to manually write mnemonic functions and reduces the man-hours required to create mnemonic functions.

Further, the function name of the mnemonic function is the same as the mnemonic of the instruction that the developer is familiar with, eliminating the need for the developer to remember the function name and providing a mnemonic function that is easily handled by the developer.

Additionally, the number of arguments of the mnemonic function is equal to the number of operands of the instruction. This adds convenience for the developer because the developer can call the mnemonic function using the code "mov(OP0, OP1)" similar to the assembly syntax "mov OP0 OP1" that the developer is familiar with.

FIG. 10 schematically illustrates a source file 43 in which C++ pseudo source code for the above MachineCodeEmitter function is written. The source file 43 may be part of the assembler's own source file.

In this example, the functionality of the MachineCodeEmitter function is achieved by code T5 to code T8. The code T5 is a statement that declares the variable "mnemonic" and the variables "op0", "op1", "op2", and "op3" as 32-bit unsigned integers.

The code T6 is code that assigns the opcode corresponding to the content of the variable nm received as the argument by the MachineCodeEmitter function to the variable "mnemonic". For example, when the mnemonic identified by the variable "nm" is "mov", the opcode "0x01000000" of the mov instruction is assigned to the variable "mnemonic".

The code T7 is code that performs bit operations on each of the variables "OP0" and "OP1" according to the content of the variable "nm" to position these variables at the bit positions determined by the specification of the instruction. For example, in the case of the mov instruction, the first operand is positioned at 17th to 24th bits of 32 bits, and the second operand is positioned at 8th to 16th bits of 32 bits. Thus, in the case of the mov instruction, the bit sequence of the variable "OP0" is positioned at 17th to 24th bits of 32 bits by executing the statement "op0=OP0<<16". Meanwhile, for the variable "OP1", the bit sequence of "OP1" is positioned at 8th to 16th bits of 32 bits by executing the statement "op1=OPT<<8". Since the mov instruction does not take the third operand, the variable "op2" is set to "0" by the statement "op2=0".

The code T8 is a statement that generates a bit sequence concatenating the variables "mnemonic", "op0", "op1", and "op2" in order from the highest-order bit, and returns the generated bit sequence as a return value. The bit sequence is the machine language representing the process to be executed by the instruction identified by the variable "nm" for the operands identified by the variable "oplist".

In the function generation method described above, the control unit 31 generates code that calls the MachineCodeEmitter function inside the mnemonic function, based on the instruction information 33. The MachineCodeEmitter function is a function that generates the machine language representing the process to be performed by the instruction represented by the argument "nm" for the operands represented by the argument "oplist". Thus, in generating the mnemonic function, the developer does not need to manually write the code that generates the machine language based on the specifications for the instruction, and the man-hours required to create mnemonic functions can be reduced.

When the processor 2 (see FIG. 1) is developed, a group of tools for generating a machine-language executable file that runs on the processor 2 is also developed. The group of tools includes a compiler for converting the source file written in C or C++ language to assembly language, and an assembler for converting the assembly language to machine language. Examples of the group of tools include, but are not limited to, LLVM. The MachineCodeEmitter function is a function embedded in the assembler of LLVM, and is provided after its behavior is verified when the assembler was developed. Therefore, in the first embodiment, there is no need to verify whether the mnemonic function generated by the control unit 31 generates correct machine language. This reduces the man-hours required to verify the behavior of mnemonic functions in addition to the man-hours required to create the mnemonic functions, reducing the man-hours associated with the creation of the mnemonic functions.

The first embodiment has described the MachineCodeEmitter function included in LLVM as an example, but the first embodiment is not limited to this. For example, the mnemonic function may be generated so as to call the machine language generating function in a group of tools (e.g., GCC) different from LLVM, instead of the MachineCodeEmitter function. The machine language generating function is a function that has the same functionality as the MachineCodeEmitter function. In this case, the control unit 31 writes code that converts the variables "mov", "OP0", and "OP1" in FIG. 9 so as to match the number of arguments and the types of the arguments of the machine language generating function in the source file 34, instead of the code T2 and the code T3.

In the example of FIG. 9, up to three variables "OP0", "OPT,", and "OP2" can be combined into the array "oplist" and passed to the MachineCodeEmitter function, but there is a machine language generating function that receives each of the variables "OP0", "OP1", and "OP2" as a separate argument. In that case, the control unit 31 does not generate the code T3, and generates code that passes each of the variables "OP0", "OP1", and "OP2" as a separate argument to the machine language generating function.

Functional Configuration

Next, the functional configuration of the information processing device 30 in accordance with the first embodiment will be described.

Figure 11:
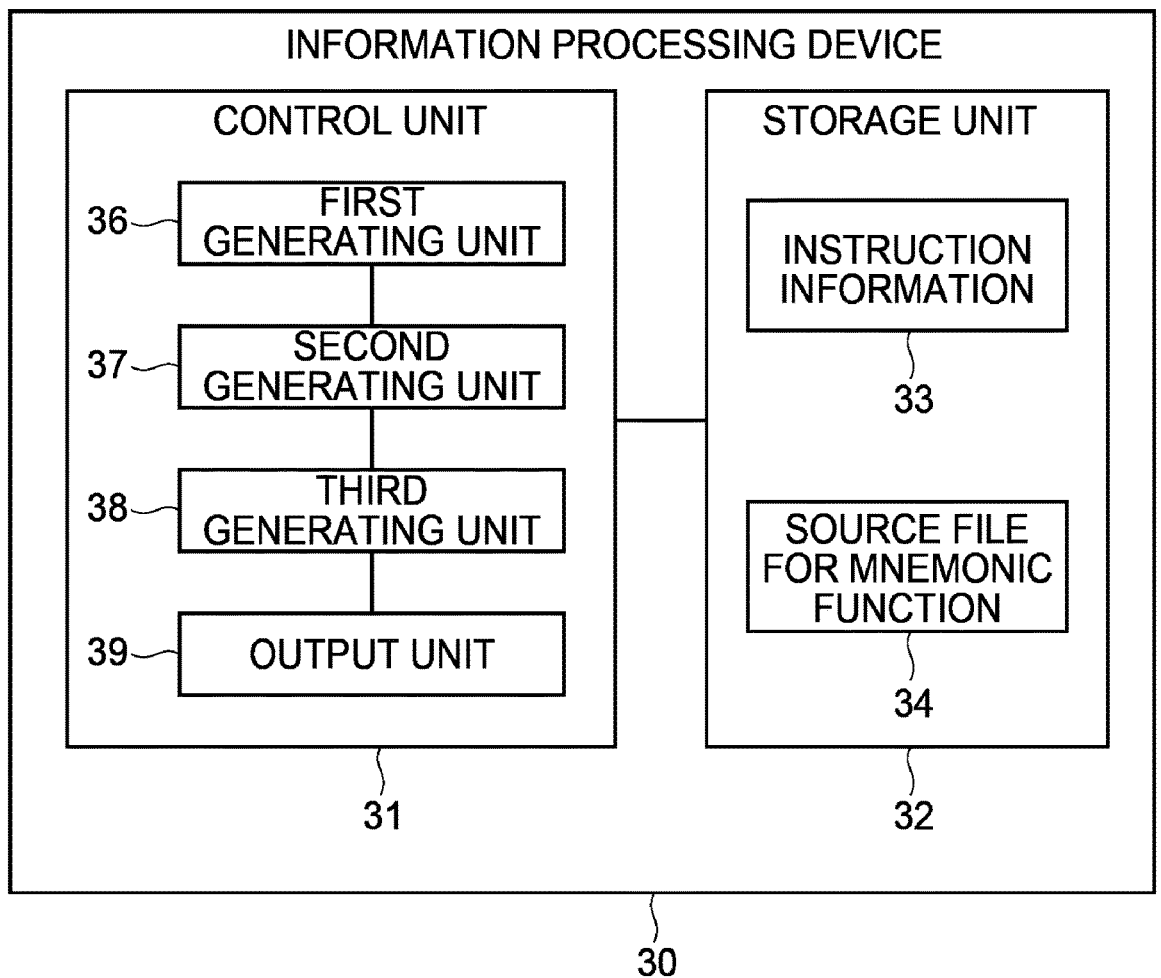
FIG. 11 is a functional block diagram of the information processing device in accordance with the first embodiment.

FIG. 11 is a functional block diagram of the information processing device in accordance with the first embodiment. As illustrated in FIG. 11, the information processing device 30 includes the control unit 31 and a storage unit 32.

The storage unit 32 can be implemented by a storage device such as a hard disk drive (HDD) and a memory such as a DRAM, and stores the instruction information 33 and the source file 34 for the mnemonic functions described above.

The control unit 31 is a processing unit that controls the entirety of the information processing device 30, and includes a first generating unit 36, a second generating unit 37, a third generating unit 38, and an output unit 39.

The first generating unit 36 is a processing unit that refers to the instruction information 33 to generate the mnemonic function corresponding to each instruction, and writes the generated mnemonic functions in the source file 34. As an example, the first generating unit 36 obtains the mnemonic from the instruction information 33, and gives the function name 34a (see FIG. 9) that is the same as the obtained mnemonic to the mnemonic function. The first generating unit 36 also declares, as the arguments of the mnemonic function, the same number of arguments as the number of operands in the instruction information 33.

For example, when the mnemonic in the instruction information 33 is "mov", the first generating unit 36 generates the function "void mov(Operand OP0, Operand OP1){ }" as the mnemonic function mov, and writes the source code for the generated function in the source file 34. The contents of the mnemonic function written by the first generating unit 36 are empty.

The first generating unit 36 may write all the mnemonic functions included in the instruction set in one source file 34, or may write the mnemonic functions in separate respective source files.

The second generating unit 37 is a processing unit that generates code that calls the MachineCodeEmitter function described above, and writes the generated code in the source file 34. The arguments of the MachineCodeEmitter function are "oplist", which is the variable corresponding to each operand, and "mov", which is the variable corresponding to the instruction. When receiving these arguments, the MachineCodeEmitter function generates the machine language representing the process that the instruction performs on the operands.

The third generating unit 38 is a processing unit that generates code that writes the machine language generated by the MachineCodeEmitter function in the memory 3, and writes the generated code in the source file 34. The code is in the format "write(MachineCodeEmitter(nm, oplist);", for example.

The output unit 39 writes the source file 34 written by the first to third generating units 36 to 38 to the storage unit 32.

Process Flow

Figure 12:
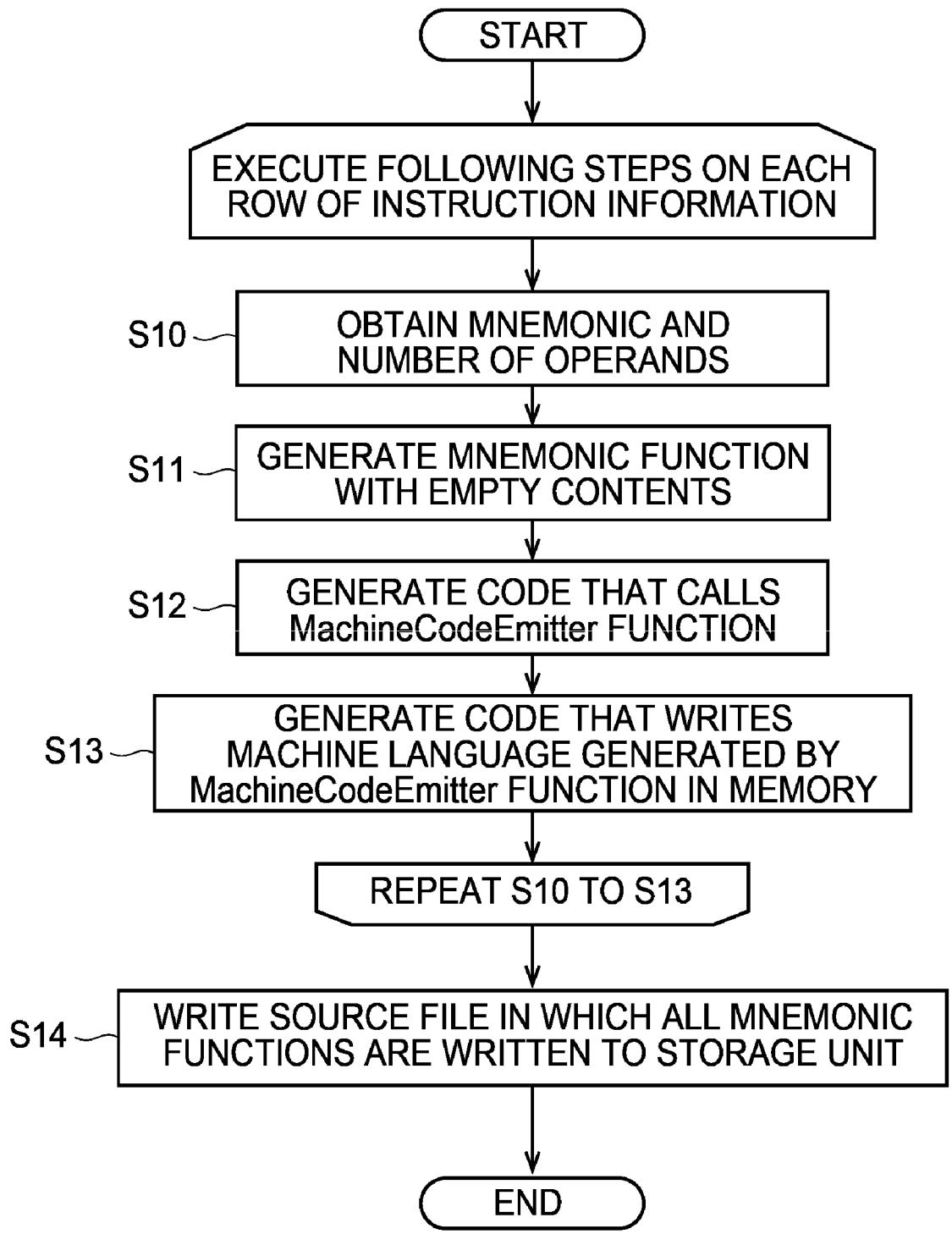
FIG. 12 is a flowchart of a function generation method in accordance with the first embodiment.

FIG. 12 is a flowchart of the function generation method in accordance with the first embodiment.

First, the first generating unit 36 refers to the instruction information 33 to obtain the mnemonic and the number of operands corresponding to the obtained mnemonic (step S10).

Then, the first generating unit 36 generates a mnemonic function with empty contents, and writes the generated mnemonic function in the source file 34 (step S11). For example, when the mnemonic is "mov", the first generating unit 36 writes the mnemonic function "void mov(Operand OP0, Operand OP1){ }" with empty contents, in the source file 34. The number of arguments of the mnemonic function is the same as the number of operands obtained in step S10.

The second generating unit 37 then generates code that calls the MachineCodeEmitter function (step S12). For example, the second generating unit 37 writes the code "MachineCodeEmitter(nm, oplist);" that calls the MachineCodeEmitter function inside the mnemonic function written by the first generating unit 36.

Along with this, the second generating unit 37 also writes a statement that passes the values of the arguments of the mnemonic function to the MachineCodeEmitter function, such as the code T2 and the code T3 in FIG. 9, in the source file 34.

Then, the third generating unit 38 generates code that writes the machine language generated by the Machine-CodeEmitter function in the memory 3 (step S13). As an example, the third generating unit 38 generates the code T4 (see FIG. 9) "write(MachineCodeEmitter(nm, oplist));", which specifies the MachineCodeEmitter function in the argument of the function write, and writes the generated code in the source file 34.

Then, the processes of steps S10 to S13 are performed for all rows included in the instruction information 33. Thereafter, the output unit 39 writes the source file 34 containing all the mnemonic functions to the storage unit 32 (step S14).

In the first embodiment described above, each of the first to third generating units 36 to 38 automatically generates a mnemonic function based on the instruction information 33. Thus, compared to the case in which the developer manually writes mnemonic functions, the man-hours required to create mnemonic functions can be reduced.

Moreover, since each of the generating units 36 to 38 generates a mnemonic function as described above, bugs are less likely to occur than when the developer manually writes the mnemonic functions. As a result, the time wasted on executing a buggy program on the target machine 1 is reduced, and wasteful consumption of hardware resources of the target machine 1 is reduced.

Development Environment

The developer can develop various application programs to be run on the processor 2 of the target machine 1 by using the source file 34 in which mnemonic functions are written as described above. The following describes the development environment for the application programs.

Figure 13:
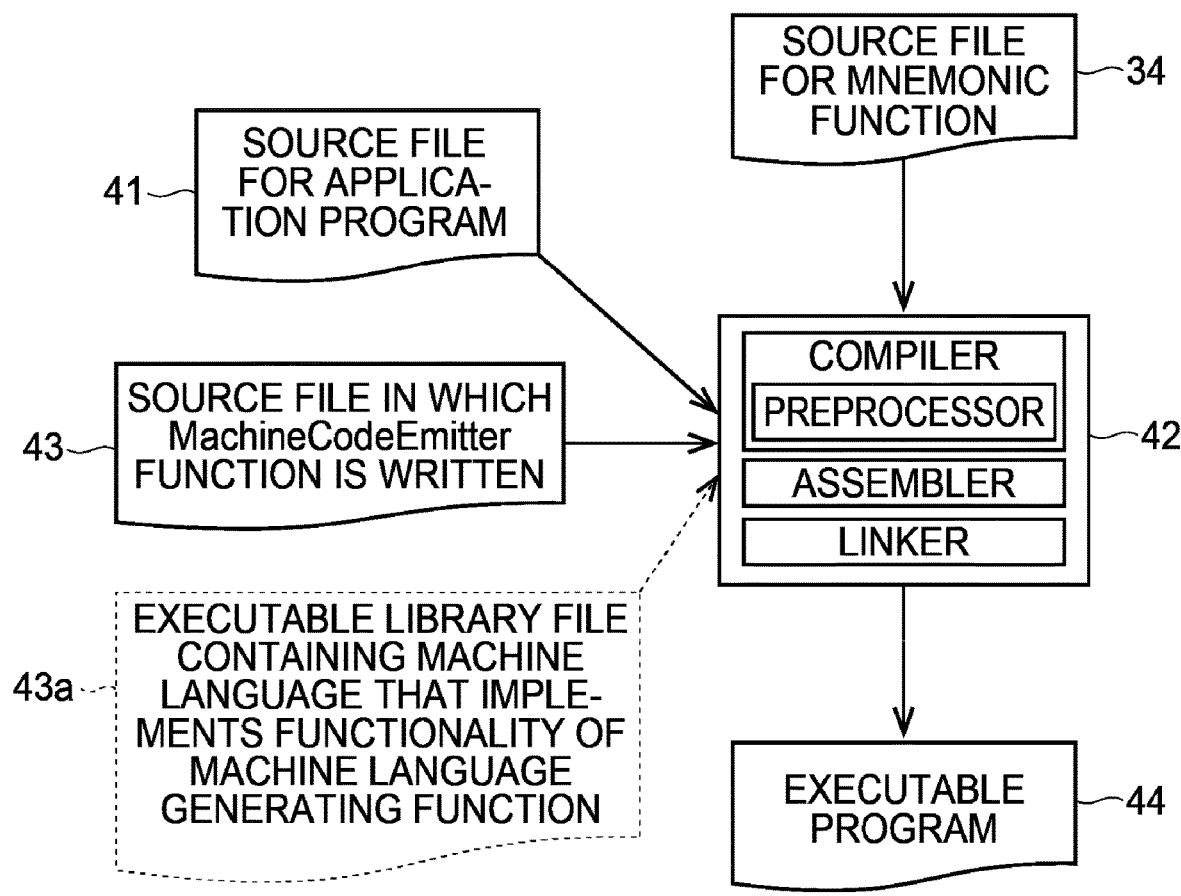
FIG. 13 schematically illustrates a development environment using a source file in which a mnemonic function is written, in the first embodiment.

FIG. 13 schematically illustrates the development environment using the source file 34 in which mnemonic functions are written.

In this example, it is assumed that the development environment is built inside the information processing device 30. In this case, the control unit 31, which is a tool for generating mnemonic functions, refers to the instruction information 33 to generate the source file 34 in which all the mnemonic functions are included, according to the flowchart in FIG. 12.

The developer creates the source file 41 for the application program using, for example, C++. The source file 41 is a file that is assumed to use the features of the JIT compiler technology, and includes descriptions that call the mnemonic functions in the source file 34 in addition to the library functions of C++.

Then, under the instruction of the developer, a program group 42 including a compiler, an assembler, and a linker performs build. The compiler includes a preprocessor for performing a directive process starting with, for example, # define. In the build, the compiler included in the program group 42 compiles the source file 41.

At this time, the compiler reads each source file 34, 41, and 43 and outputs an intermediate language file for the assembly. Among these source files, the source file 43 is a source file in which the aforementioned MachineCodeEmitter function is written. The assembler converts the intermediate language file into a machine-language instruction sequence to generate an object file.

Thereafter, the linker generates an executable program 44 in binary format that can run on the processor 2 by linking the object file to various libraries.

The description here is based on the example that the aforementioned source file 43 is part of the assembler's own source file. Through the operation verification when developing the assembler, it has been verified that the behavior of the MachineCodeEmitter function written in the source file 43 is correct.

On CPUs where the rules for generating machine language are kept secret, the assembler source files are not publicly available, but the execution library files may be available. In such a case, instead of the source file 43, an executable library file 43a, in which the functionalities of the machine language generating function have been converted into a machine language instruction sequence in advance, is used as input, and the executable program 44 is generated by linking it.

Through the above process, the executable program 44 can be generated from the source file 41 for the application program.

The executable program 44 generates, at run-time, the optimal machine-language instruction sequence according to parameters and environments at run-time using the JIT compiler technology. Therefore, this executable program 44 is particularly effective in speeding up application programs that have a large number of loops and require large-scale operations, such as deep learning and image processing. Similarly, application programs used for video compression and other image processing, encryption and decryption processes, and blockchain technology can also be accelerated.

To further increase the execution speed of the executable program 44, the mnemonic function may be written as a C++ macro as follows.

Figure 14:
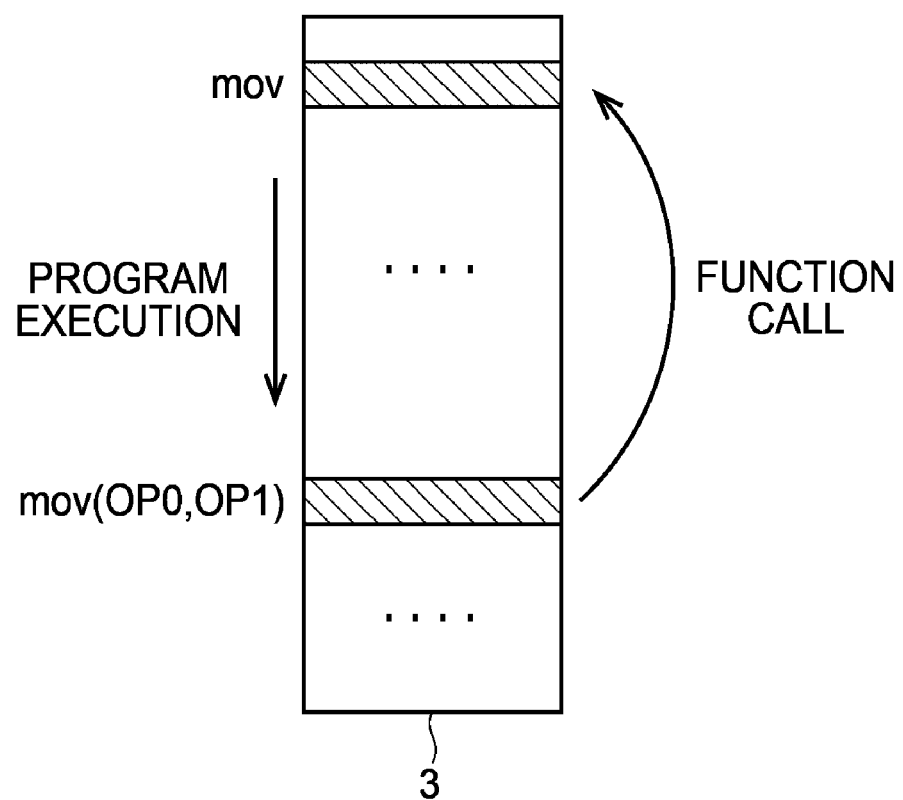
FIG. 14 schematically illustrates contents of a memory when an executable program generated without using a C++ macro is executed.

FIG. 14 schematically illustrates the contents of the memory 3 when the executable program 44 generated without using a C++ macro is executed.

In this example, it is assumed that the mnemonic function mov(OP0, OP1) is written in the source file 41 by the developer. In this case, when the address at which the instruction should be executed reaches the memory address where the machine language corresponding to the process that calls the mnemonic function mov(OP0, OP1) is stored, the mnemonic function mov in the source file 34 is called by function call.

The function call process has a large overhead because the data in the registers R0, R1, . . . are saved to the memory 3 before processing and the data are restored to the registers R0, R1, . . . after processing, slowing down the execution of programs.

Figures 15A, 15B:
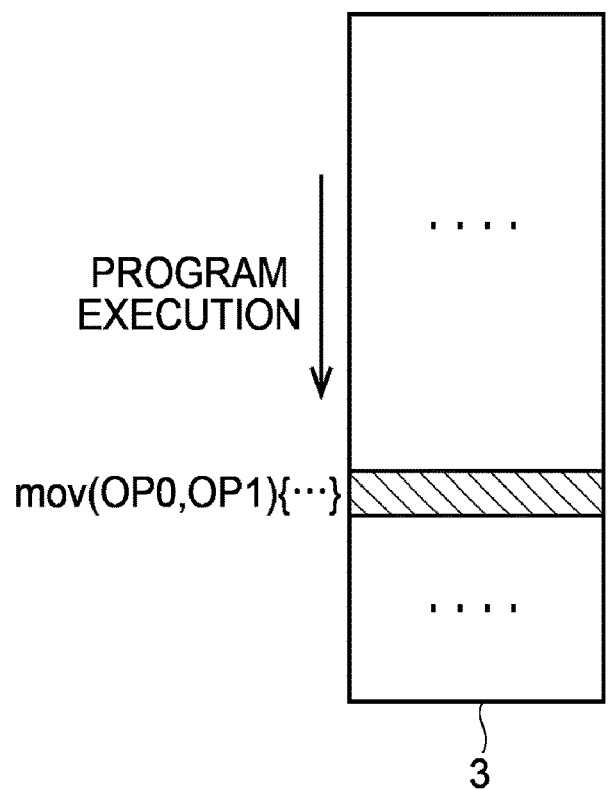
FIG. 15A illustrates source code in which a first generating unit in accordance with the first embodiment writes a mnemonic function mov as a C++ macro, and FIG. 15B schematically illustrates contents of the memory when the executable program is executed using the macro.

FIG. 15A illustrates source code 45 in which the first generating unit 36 generates the mnemonic function mov as a C++ macro.

As illustrated in FIG. 15A, the first generating unit 36 writes the macro of the mnemonic function mov in the source file 34 using the macro "# define" in step S11 (see FIG. 12).

FIG. 15B schematically illustrates the contents of the memory 3 when the executable program 44 is executed in the case that the macro is used as described above.

When a macro is used, the preprocessor expands the source code 45 to the part where the mnemonic function mov(OP0, OP1) is written in the source file 41 at compile time. Thus, the machine language that executes "mov OP0, OP1" can be written in the memory 3 without function call, increasing the execution speed of the process in which the executable program 44 generates the machine language using the JIT compile technology.

Second Embodiment

The instruction set may contain multiple instructions that have the same mnemonic but different machine language. If the function names of mnemonic functions are changed for each of these instructions to reflect such differences, the number of function names to be memorized by the developer will increase, increasing the burden on the developer. Thus, in a second embodiment, a description will be given of an example in which increase in burden on the developer can be reduced even when there are multiple instructions with the same mnemonic but different machine language.

First, the instructions having the same mnemonic but different machine language will be described.

FIG. 16 illustrates an example in which such instructions are written in an assembly.

These instructions 51 and 52 are both store instructions, and their mnemonics are both "STR".

The instruction 51 is an instruction to write the value of "SRC register" in the memory 3 (see FIG. 1) indicated by the address stored in "address register" and then increment the value stored in "address register" by "immediate value".

The instruction 52 is an instruction to first increment the value stored in "address register" by "immediate value" and then write the value of "SRC register" in the memory 3 indicated by the address of the incremented value.

As described above, the instructions 51 and 52 differ in the timing at which the value stored in "address register" is incremented by "immediate value", and are the instructions that perform different processes.

For example, in the instruction 51, the string of characters subsequent to the mnemonic is "SRC register, [address register], immediate value", while in the instruction 52, the string of characters is "SRC register, [address register, immediate value]!". The assembler distinguishes between the instructions 51 and 52 based on such a difference in string of characters, replaces, inside the assembler, the mnemonic of the instruction 51 with "STRpost" and the mnemonic of the instruction 52 with "STRpre".

FIG. 17A schematically illustrates the instruction information 33 of the first embodiment when these mnemonics "STRpost" and "STRpre" are employed.

FIG. 17B illustrates the mnemonic functions generated, based on this instruction information 33, according to the first embodiment.

As illustrated in FIG. 17B, in this case, the mnemonic function STRpost corresponding to the instruction 51 and the mnemonic function STRpre corresponding to the instruction 52 are generated. The developer is to memorize the function names "STRpost" and "STRpre", and write them in the source file for the application program.

However, even though the two instructions, which are the bases of these mnemonic functions, are both store instructions, these different function names increase the number of function names that the developer is to memorize, which increases the burden on the developer.

Therefore, in the second embodiment, the increase in the number of function names of mnemonic functions is inhibited as follows.

FIG. 18 schematically illustrates the instruction information 33 used in the second embodiment.

As illustrated in FIG. 18, in the instruction information 33 in accordance with the second embodiment, the function name, the mnemonic, the number of operands, and the types of the operands are stored in association with each other. Rows of the instruction information 33 correspond to respective different instructions. For example, the first row corresponds to the mov instruction, and the second row corresponds to the load instruction. As in the first embodiment, the instruction information 33 is created by the developer in advance.

In the instruction information 33, the function name is the name of the mnemonic function, and stores the name corresponding to each mnemonic. In the second embodiment, it is not necessary to make the function name and the mnemonic correspond one-to-one with each other, and a single function name that the developer can easily memorize may be made to correspond to multiple mnemonics regardless of the mnemonic. For example, the STRpost instruction and the STRpre instruction are both store instructions. Thus, the function names corresponding to these instructions are both "STR".

The number of operands is the number of operands taken by each instruction as in the first embodiment.

The types of the operands list types indicating the kinds of the operands of the instruction. For example, in the mov instruction, the first operand is a register, and the second operand is an immediate value. In the second embodiment, the Register type indicating a register and the Immediate type indicating an immediate value are defined in advance, and a list of these types is stored in the instruction information 33 in association with the mnemonic "mov" in advance. A first component of the list indicates the type of the first operand, and a second component indicates the type of the second operand. In an instruction that takes three operands, a third component of the list indicates the type of the third operand.

Here, in C++ syntax, even when the function names and the number of the arguments are respectively the same between the two functions, these functions can be treated as different functions when the types of the arguments are different.

Thus, in the second embodiment, by making the types of the arguments different between the two mnemonic functions STR, different processes are achieved even when the function name and the number of the arguments are respectively the same between the two functions. In this example, the types of the arguments of the mnemonic function STR corresponding to the mnemonic "STRpost" are the Register type and the PostIncAddrReg type. On the other hand, the types of the arguments of the mnemonic function STR corresponding to the mnemonic "STRpre" are the Register type and the PreIncAddrReg type.

As a result, in the instruction information 33 in accordance with the second embodiment, there are multiple mnemonics "STRpre" and "STRpost" with the same function name "STR" and different operand types.

In the instruction information 33 in the first embodiment, as illustrated FIG. 17A, the number of operands of the mnemonic "STRpost" is "3", while in the second embodiment, the number of operands is "2" as illustrated in FIG. 18. This is because the PostIncAddrReg type has two members, which can store the second and third operands of the STRpost instruction, as described below. Similarly, the PreIncAddrReg type has two members, which can store the second and third operands of the STRpre instruction. Therefore, the number of operands corresponding to "STRpre" is also "2".

FIG. 19A to FIG. 19E illustrate examples of C++ pseudo source code that defines the type of the operand.

FIG. 19A illustrates source code that defines the Register type. The Register type is a type indicating a register as described above. Here, the class name of the class that defines the Register type is "Reg", and the member of the class is "regIndex". The "regIndex" is a variable that stores the index of the register, and is declared as, for example, an unassigned integer type.

FIG. 19B illustrates source code that defines the AddrReg type. The AddrReg type is a type indicating an address register. The members of the class "AddrReg" indicating the AddrReg type are "regIndex" that stores the index of the register holding the base value of the address, and "imm_value" that stores the immediate value that is the address offset value. The initial value of "imm_value" is 0.

FIG. 19C illustrates source code that defines the PostIncAddrReg type.

The members of the class of the PostIncAddrReg type are "regIndex" that stores the index of the register holding the base value of the address, and "imm_value" that stores the immediate value indicating how much the base value of the address is incremented after the execution of the instruction.

FIG. 19D illustrates source code that defines the PreIncAddrReg type.

The members of the class of the PreIncAddrReg type are "regIndex" that stores the register holding the base value of the address, and "imm_value" that stores the immediate value indicating how much the base value of the address is incremented before the execution of the instruction.

FIG. 19E illustrates source code that defines the Immediate type. The Immediate type is a type indicating an immediate value as described above. In this example, the class name of the class that defines the Immediate type is "Imm", and the member of the class is "imm_value". Here, "imm_value" is an integer-type variable that stores an immediate value.

FIG. 20A schematically illustrates the source file 34 in which C++ pseudo source code for the mnemonic function STR corresponding to the mnemonic "STRpost" is written.

The source code for the mnemonic function STR is generated by the control unit 31 based on the instruction information 33 as follows.

For example, since the function name corresponding to the mnemonic "STRpost" in the instruction information 33 (see FIG. 18) is "STR", the control unit 31 sets a function name 53a of the mnemonic function to "STR".

The control unit 31 also identifies that the number of operands of the mnemonic "STRpost" is "2" by referring to the instruction information 33, and declares two variables "OP0" and "OP1_2" as the arguments in code T11.

Furthermore, the control unit 31 identifies that the types of the operands of the mnemonic "STRpost" are the Register type and the PostIncAddrReg type by referring to the instruction information 33. Based on this, the control unit 31 declares the types of the variables "OP0" and "OP1_2" to be the Register type and the PostIncAddrReg type, respectively, in the code T11.

Additionally, the control unit 31 generates code T12 to code T15 inside this mnemonic function STR.

The code T12 is a statement that assigns the mnemonic "STRpost" of the instruction information 33 to the variable "nm". The control unit 31 determines the number of variables to be included in the argument "oplist" of the MachineCodeEmitter function based on the Register type and the PostIncAddrReg type identified from the instruction information 33. For example, the Register type has one member variable, and the PostIncAddrReg type has two member variables. Thus, the total number of the member variables of these types is three. Thus, the control unit 31 generates the code T13 that declares three Operand-type variables "op0", "op1", and "op2" corresponding to the three members. The variable "op0" corresponds to the Register-type variable "OP0". The variables "op1" and "op2" are two variables corresponding to the PostIncAddrReg-type variable "OP1_2". How many member variables that each of the Register type, the AddrReg type, the PostIncAddrReg type, the PostIncAddrReg type, and the Immediate type has is defined in the source file that defines each class illustrated in FIG. 19 in advance.

The code T14 is code that converts each of the variables "OP0" and "OP1_2" received as the arguments by the mnemonic function STR into the type of the argument "oplist" of the MachineCodeEmitter function.

For example, the string of characters "REGISTER" corresponding to "Register", which is the type of the variable OP0, is assigned to the member "type" of the variable op0 by the statement "op0.type=REGISTER". In addition, the member "regIndex" of the variable OP0 is assigned to the member "value" of the variable op0 by the statement "op0.value=OP0.regIndex;".

Similarly, the statement "op1.type=REGISTER;" and the statement "op1.value=OP1_2.regIndex;" are statements that typecast the PostIncAddrReg-type variable OP1_2 to the Operand-type variable op1. The statement "op2.type=IMMEDIATE_VALUE;" and the statement "op2.value=OP1_2.imm_value;" are statements that typecast the PostIncAddrReg-type variable "OP12" to the Operand-type variable "op2".

Furthermore, the statement "oplist={op0, op1, op2}" is code that assigns the variables "op0", "op1", and "op2" to respective elements of the Operand-type array "oplist". The array "oplist" is passed to the MachineCodeEmitter function in the code T15.

The code T15 is code that calls the MachineCodeEmitter function and writes the machine language generated by the MachineCodeEmitter function in the memory 3 using the function write.

According to such source code, each of the variables "OP0" and "OP1_2" received as the arguments by the mnemonic function STR is converted into the Operand-type array "oplist" in the code T14. Thus, the types of the variables "OP0" and "OP1_2" can be matched with the type of the second argument "oplist" of the MachineCodeEmitter function, and the machine language intended by the developer can be generated by the MachineCodeEmitter function.

FIG. 20B schematically illustrates the source file 34 in which C++ pseudo source code for the mnemonic function STR in accordance with the second embodiment, corresponding to the mnemonic "STRpre" is written.

Similar to the example of FIG. 20A, the control unit 31 generates the source code of this mnemonic function STR based on the instruction information 33. In FIG. 20A and FIG. 20B, the function names are both "STR", but the types of the second arguments of these functions are different. Therefore, these functions are distinguished as separate functions in C++ syntax, and are not a problem.

As described above, in the second embodiment, by storing multiple mnemonics having the same function name and the same number of arguments but different types of operands in the instruction information 33, the mnemonic functions having the same function name can be generated from these mnemonics. This prevents the number of function names of mnemonic functions from increasing, and thus prevents the number of function names to be memorized by the developer from increasing.

In addition, the second embodiment provides the advantages that debugging becomes easy as follows.

FIG. 21A illustrates C++ pseudo source code 55 for the mnemonic function mov when the arguments of the mnemonic function are represented by the Operand type, which is the common type, unlike the second embodiment. In this case, the types of the arguments of the mnemonic function mov and the type of the second argument of the MachineCodeEmitter function are all the Operand types, typecasting code as in the second embodiment is not written inside the mnemonic function mov.

FIG. 21B illustrates C++ pseudo source code in the source file 41 for the application program written by the developer using this mnemonic function mov.

The developer intends to represent that the first argument "OP0" is a register by the statement "op0.type=REGISTER;" in the source file 41, and intends to represent that the second argument "OP1" is an immediate value by the statement "op1.type=IMMEDIATE_VALUE". Since the statement "mov(OP1, OP0);" in the source file 41 is written so that the mnemonic function mov accepts two Operand-type variables as the arguments in FIG. 21A, there is no problem in C++ syntax.

However, the mnemonic function mov and the MachineCodeEmitter function are generated on the presumption that the first operand of the mov instruction is a register, and the second operand is an immediate value. In the statement "mov(OP1, OP0);", the variable "OP1" representing an immediate value is specified in the first argument, and the variable "OP0" representing a register is specified in the second argument. The statement "mov(OP1, OP0);" has no problem in C++ syntax, and therefore, such a mistake does not cause errors at compile time.

Therefore, in this case, after executing the compiled program, the developer recognizes that the results obtained in the output are different from the results to be obtained, and only then notices the mistake in the source code of the source file 41. If the developer does not notice that the results are wrong, the developer will overpass the mistake, assuming that the correct output is being obtained. Furthermore, even though the developer notices that the outputs are wrong, when the number of lines of the description in the source file 41 is large, it takes a long time for the developer to identify erroneous part of the description, resulting in a long time for debugging.

FIG. 22A schematically illustrates the source file 34 in which C++ pseudo source code for the mnemonic function mov generated in the second embodiment is written. In the second embodiment, the types of the arguments of the mnemonic function mov are {Register type, Immediate type}

FIG. 22B illustrates C++ pseudo source code in the source file 41 for the application program written by the developer using this mnemonic function mov.

Discussed here is the case that the developer accidentally reversed the types of the first and second arguments of the mnemonic function mov and wrote "mov(imm, reg);". In this case, the compiler reports errors at compile time because the order of the types of the arguments in the call to the mnemonic function mov in the source file 41 is wrong. Thus, the developer can notice the mistake earlier than in the example of FIG. 22A, and it is easier for the developer to identify the erroneous part based on the error message at compile time.

Process Flow

Next, a description will be given of a function generation method in accordance with the second embodiment.

Figure 23:
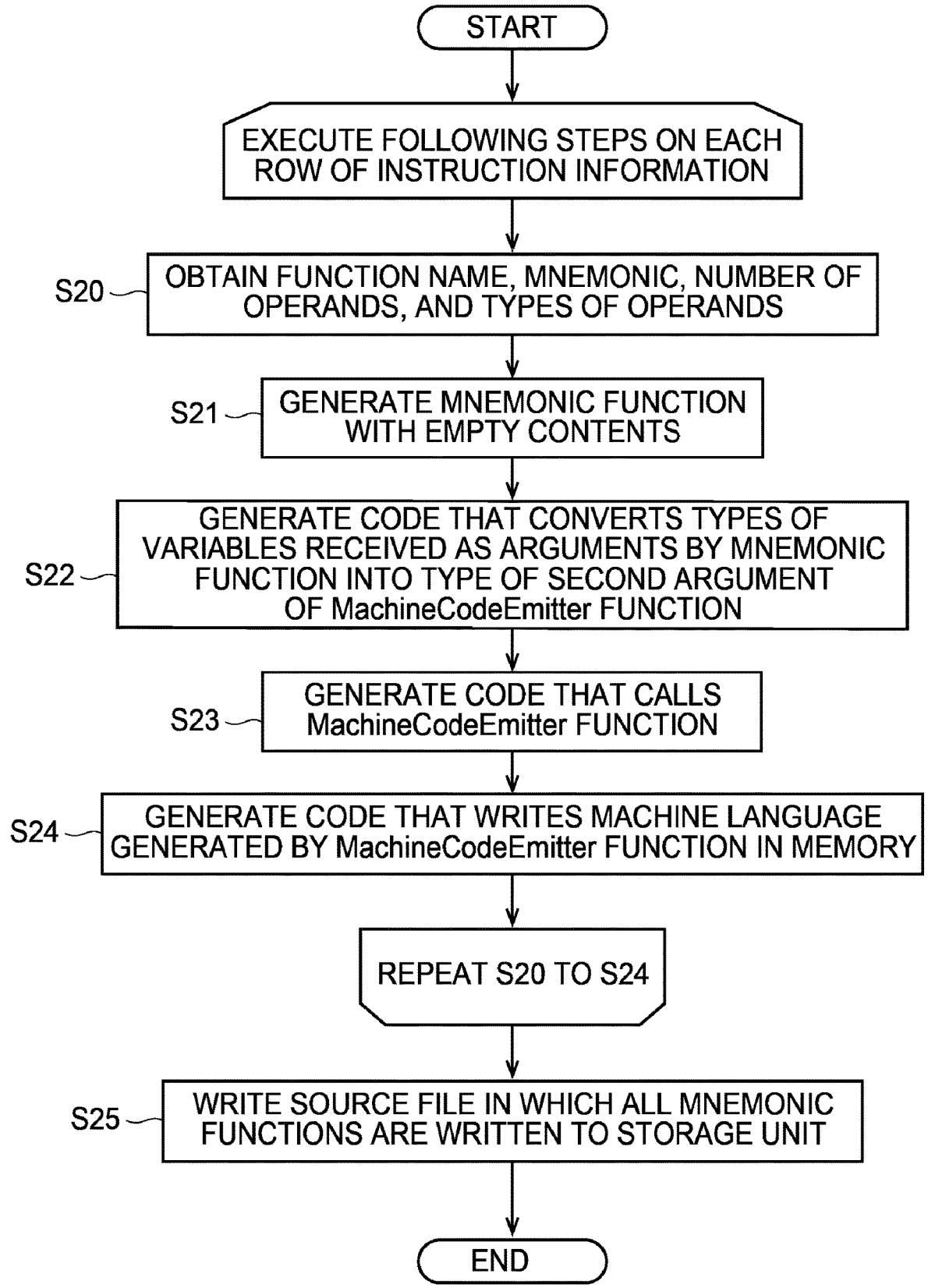
FIG. 23 is a flowchart of a function generation method in accordance with the second embodiment.

FIG. 23 is a flowchart of the function generation method in accordance with the second embodiment.

First, the first generating unit 36 refers to the instruction information 33 to obtain the function name, the mnemonic, the number of operands, and the types of the operands that are associated with each other (step S20).

Then, the first generating unit 36 generates a mnemonic function with empty contents, and writes the generated mnemonic function in the source file 34 (step S21). The number of arguments of the generated mnemonic function is the same as the number of operands obtained in step S20. The first generating unit 36 also generates the code T11 (see FIG. 20A), which declares the types of the operands obtained in step S20 to be the types of the arguments of the mnemonic function.

Then, the second generating unit 37 generates code that converts the types of the variables received as the arguments by the mnemonic function into the Operand type of the array "oplist", which is the second argument of the Machine-CodeEmitter function (step S22). For example, the second generating unit 37 generates the code T14 described in FIG. 20, and writes the generated code T14 inside the mnemonic function.

Then, the second generating unit 37 generates code that calls the MachineCodeEmitter function (step S23). For example, the second generating unit 37 generates the code "MachineCodeEmitter(nm, oplist);" that calls the MachineCodeEmitter function, and writes the generated code inside the mnemonic function. At this time, the second generating unit 37 passes the array "oplist" that has been typecasted in step S22, to the second argument of the MachineCodeEmitter. Along with this, the second generating unit 37 writes a statement that declares and assigns variables, such as the code T11 and the code T12 in FIG. 20, in the source file 34.

Then, the third generating unit 38 generates code that writes the machine language generated by the MachineCodeEmitter function in the memory 3, and writes the generated code in the source file 34 (step S24). As an example, the third generating unit 38 writes the code "write (MachineCodeEmitter(nm, oplist));", in which the MachineCodeEmitter function is specified in the argument of the function write, in the source file 34.

The processes in steps S20 to S24 are performed on all rows included in the instruction information 33. Thereafter, the output unit 39 writes the source file 34 containing all the mnemonic functions to the storage unit 32 (step S25).

In the second embodiment described above, in step S21, the first generating unit 36 generates the code T11 that declares the types of the operands to be the types of the arguments of the mnemonic function (see FIG. 20A). This allows the function names of the mnemonic functions to be the same, preventing the number of function names to be memorized by the developer from increasing.

Additionally, as described with reference to FIG. 22A and FIG. 22B, when the types of the arguments of the mnemonic function are incorrect, an error is raised at compile time, reducing bugs in the source file 41. This reduces the time wasted on executing a buggy program on the target machine 1, improves the wasteful consumption of the hardware resource of the target machine 1, and reduces the man-hours required for the developer to debug the program.

Third Embodiment

Some instructions in the instruction set have restrictions imposed on the values of the operands. For example, in the mov instruction written in the format of "mov operand0, operand1", the range of the immediate value "operand1" is limited to −256 to +255, which can be expressed by a signed 9-bit integer. Even when the developer forgets these restrictions and writes the mnemonic function mov in the source file 34, that source file 34 will not cause an error at compile time, but will cause an error at run-time. This will be described with reference to FIG. 24A and FIG. 24B.

FIG. 24A illustrates the source file 34 in which C++ source code for the mnemonic function mov generated according to the second embodiment is written. In this source code, there are restrictions on types, such as the Register type and the Immediate type, for the arguments OP0 and OP1, but there are no restrictions on the values of the arguments.

FIG. 24B illustrates C++ pseudo source code in the source file 41 for the application program written by the developer using this mnemonic function mov.

In this example, the value "−1000000" is assigned to the member "value" of the variable imm by the statement "imm.value=−1000000;". As described above, the value of the second operand of the mov instruction is limited to the range of −256 to +255. Thus, the value "−1000000" is an inappropriate value for the second argument.

However, since the source file 41 is written correctly in C++ syntax, no error occurs at compile time. When the executable program obtained by compilation is executed, the executable program attempts to generate the machine language corresponding to the mov instruction that stores the immediate value −1000000 in the register, by calling the MachineCodeEmitter function. However, since there is no machine language corresponding to such behavior, the executable program cannot generate that machine language and outputs an error. In this case, when the number of lines of the description in the source file 41 is large, it is difficult for the developer to determine which mnemonic function call in the source file 41 is causing this error.

A third embodiment makes the developer notice the mistake of the source code in the source file 41 as follows.

FIG. 25 schematically illustrates the instruction information 33 used in the third embodiment.

As illustrated in FIG. 25, in the instruction information 33 in accordance with the third embodiment, the function name, the mnemonic, the number of operands, the types of the operands, and restrictions imposed on the operands are stored in association with each other. As in the first and second embodiments, this instruction information 33 is created by the developer in advance.

As in the first and second embodiments, individual rows of the instruction information 33 correspond to different instructions. For example, the first row corresponds to the mov instruction, and the restrictions imposed on the operands are expressed in the form of the list {Range of index of register is 0 to 31, Range of immediate value is −256 to +255}. A first component of the list represents the restriction on the first operand, and a second component represents the restriction on the second operand. When the instruction takes the third operand, the restriction on the third operand is stored in a third component of the list.

The second row of the instruction information 33 corresponds to the shiftR instruction, and the restrictions imposed on the operands are {Range of index of register is 0 to 31, Range of index of register is 0 to 31, Range of immediate value is −63 to +63}.

FIG. 26 schematically illustrates C++ pseudo source code in the source file 34 in which the mnemonic function mov in accordance with the third embodiment corresponding to the mov instruction is written.

The source code for this mnemonic function mov is generated by the control unit 31 based on the instruction information 33 as follows.

First, the control unit 31 writes the code T11 to the code T15 in the mnemonic function mov as in the second embodiment. Furthermore, the control unit 31 refers to the instruction information 33 to obtain the restrictions on the operands for each instruction. For example, in the case of the mov instruction, the control unit 31 obtains the restrictions {Range of index of register is 0 to 31, Range of immediate value is −256 to +255}.

Then, the control unit 31 generates code T16 that throws an exception when the operands represented by the arguments of the mnemonic function mov violate the above restrictions, and writes the generated code 16 in the source file 34.

Here, it is determined whether the operand violates the restriction using an if statement, and when the operand violates the restriction, an exception is thrown using a throw statement. For example, when the value of regIndex of "OP0" is not within the range of 0 to 31, the error message "Invalid register index is passed to mov mnemonic function." is output to the standard output when the program is executed. When the value of value of "OP1" is not within the range of −256 to +255, the error message "Invalid immediate value is passed to mov mnemonic function." is output to the standard output when the program is executed.

FIG. 27 illustrates C++ pseudo source code in the source file 41 for the application program written by the developer using this mnemonic function mov.

In this example, 1000000 is assigned to the member "value" of the second argument "imm0" of the mnemonic function mov by the statement "imm0.value=1000000;". As described above, the value of the second operand of the mov instruction is limited to the range of −256 to +255. Therefore, when the statement "mov(reg0, imm0);" is executed, an exception is raised, and the string of characters "Invalid immediate value is passed to mov mnemonic function." is output to the standard output.

This allows the developer to notice that the argument of the mnemonic function mov violates the restrictions on the mov instruction and to easily debug a source code 66.

Process Flow

Next, a function generation method in accordance with the third embodiment will be described.

Figure 28:
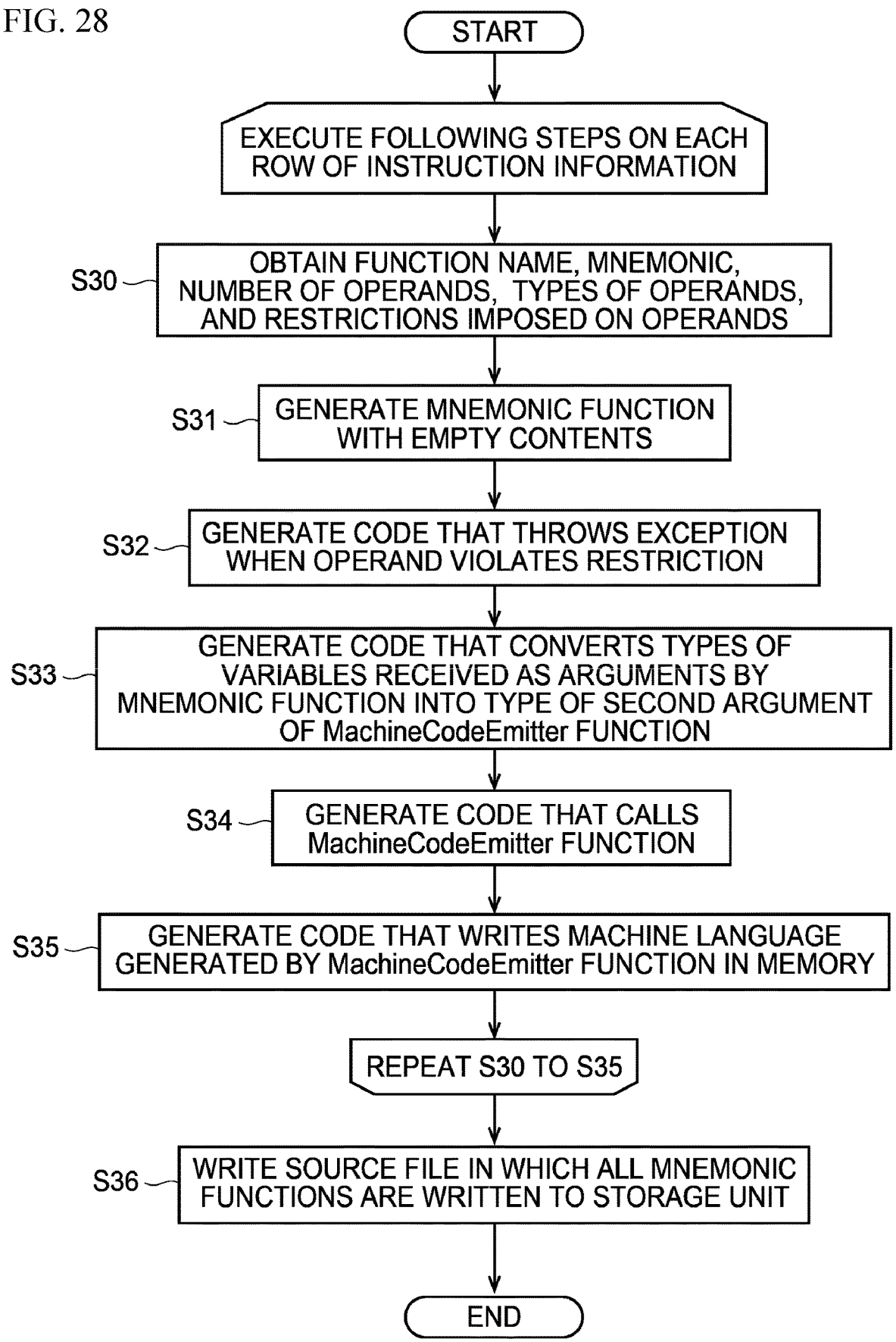
FIG. 28 is a flowchart of a function generation method in accordance with the third embodiment.

FIG. 28 is a flowchart of the function generation method in accordance with the third embodiment.

First, the first generating unit 36 refers to the instruction information 33 to obtain the function name, the mnemonic, the number of operands, the types of the operands, and the restrictions imposed on the operands that are associated with each other (step S30).

Then, the first generating unit 36 generates a mnemonic function with empty contents, and writes the generated mnemonic function in the source file 34 (step S31). The number of the arguments of the generated mnemonic function is the number of operands obtained by the first generating unit 36 in step S30. The types of the arguments of the generated mnemonic function are the types of the operands obtained by the first generating unit 36 in step S30.

Then, the second generating unit 37 generates code that throws an exception when the operand corresponding to the variable received as the argument by the mnemonic function violates the restriction (step S32). For example, the second generating unit 37 generates the code T16 described in FIG. 26, and writes the generated code T16 inside the mnemonic function.

Then, the second generating unit 37 generates code that converts the types of the variables received as the arguments by the mnemonic function into the Operand-type array that is the second argument of the MachineCodeEmitter function (step S33). For example, the second generating unit 37 writes the code T14 described in FIG. 26 inside the mnemonic function.

Then, the second generating unit 37 generates code that calls the MachineCodeEmitter function (step S34). For example, the second generating unit 37 writes the code "MachineCodeEmitter(nm, oplist)" inside the mnemonic function. Along with this, the second generating unit 37 also writes a statement, such as the code T12 and the code 13 in FIG. 26, that declares and assigns variables, in the source file 34.

Then, the third generating unit 38 generates code that writes the machine language generated by the MachineCodeEmitter function in the memory 3 (step S35). For example, the third generating unit 38 writes the code "write (MachineCodeEmitter(nm, oplist));" in which the MachineCodeEmitter function is specified in the argument of the function write, in the source file 34.

The processes in steps S30 to S35 are performed on all rows included in the instruction information 33. Thereafter, the output unit 39 writes the source file 34 containing all the mnemonic functions to the storage unit 32 (step S36).

In the third embodiment described above, in step S32, the second generating unit 37 generates the code T16 that throws an exception when the operand violates the restriction (see FIG. 26). Therefore, the developer can notice the mistake of the source code 66 (see FIG. 27) early, and the man-hours required for the developer to debug the source code 66 can be reduced. In addition, the time wasted on executing a buggy program on the target machine 1 is reduced, and the wasteful consumption of the hardware resources of the target machine 1 can be improved.

The types of the "restrictions imposed on operands" in the instruction information 33 include (1) "The index of the register is within a particular range", (2) "The immediate value is within a particular range", (3) "The immediate value is an integer", (4) "The immediate value is a decimal, and other restrictions. In this case, the data format of the instruction information 33 obtained by the control unit 31 is a format having the number (1) to (4) indicating the type of "restrictions imposed on operands", the upper limit of the restriction, and the lower limit of the restriction.

Templates for the code that checks the violation of the restriction by the operand corresponding to (1) to (4) are prepared in advance, and in step S32, the control unit 31 refers to the necessary templates. Furthermore, in the case that the upper and lower limits of the restriction are required to be checked, the control unit 31 generates code that throws an exception by embedding these values in the template.

Fourth Embodiment

A fourth embodiment makes the developer notice the mistake of the source code more easily than in the third embodiment. The mnemonic function used in the fourth embodiment is not particularly limited, but the following will describe the mnemonic function corresponding to an add instruction as an example. First, the add instruction will be described.

FIG. 29A and FIG. 29B illustrate the syntax of the assembly of the add instruction.

Although there are various types of add instructions that take various operands, FIG. 29A illustrates the add instruction that takes "DST register" and two "SRC register" as its operands. This add instruction is an instruction to store the value obtained by adding up the contents of the two "SRC register" in "DST register".

FIG. 29B illustrates another add instruction that takes three operands "DST register", "SRC register", and "immediate value". This add instruction is an instruction that stores the value obtained by adding "immediate value" to the content of "SRC register" in "DST register".

FIG. 30 schematically illustrates the instruction information 33 in accordance with the fourth embodiment.

As illustrated in FIG. 30, in this instruction information 33, the function name, the mnemonic, the number of operands, the types of the operands, and the restrictions imposed on the operands are stored in association with each other according to the third embodiment. In the fourth embodiment, the function name will be represented by uppercase letters of the alphabet. As in the first to third embodiments, the instruction information 33 is created by the developer in advance.

Since two function names "ADD" are stored in the instruction information 33 so as to correspond to the two add instructions in FIG. 29A and FIG. 29B, the control unit 31 generates two mnemonic functions ADD according to the third embodiment. As described in the third embodiment, even when there are multiple mnemonic functions having the same number of arguments and the same function name, they can be distinguished from each other in C++ syntax when the types of the arguments are different.

The following will describe the mnemonic function ADD corresponding to the second row of the instruction information 33 as an example. According to the instruction information 33, the types of the operands of this mnemonic function ADD are {Register type, Register type, Immediate type}. The restrictions imposed on the first operand and the second operand are both "Range of index of register is 0 to 31". The restriction imposed on the third operand is "Range of immediate value is −1024 to +1023".

FIG. 31 illustrates source code for the mnemonic function ADD generated by the control unit 31 according to the third embodiment based on this instruction information 33.

Here, it is assumed that the control unit 31 generates the source file 34 with the file name "mnemonic.h" and the description for the mnemonic function ADD begins at line 20. In this source file 34, the same reference character is assigned to the same kind of code as described in the third embodiment, and the description thereof is omitted.

As illustrated in FIG. 31, in this source file 34, the code T11 to the code T16 described in the third embodiment are generated by the control unit 31. The code T16 is code that throws an exception when the operand represented by the argument of the mnemonic function ADD violates the restriction in the instruction information 33.

Furthermore, in this example, the control unit 31 generates code T17 that calls the function "SET( )" at line 21 of the source file 34.

FIG. 32 schematically illustrates C++ pseudo source code that defines the function "SET( )".

The definition of the function "SET( )" is written in part of mnemonic.h, which is the source file 34, by the control unit 31. In this example, the control unit 31 generates code T20 to code T22 for defining the function "SET( )" in the source file 34.

The code T20 is code that declares a macro for the function "SET( )". Here, it is defined that the function "SET( )" is to be replaced with the function "setCodeInfo (_FILE_, _LINE_, _func_)" by a preprocessor.

The variables "_FILE_" and "_LINE_" that appear in the arguments of the function "setCodeInfo" are predefined macros in C++, and the variable "_func_" is a predefined identifier in C++. These variables are converted into predetermined contents by the preprocessor at compile time. For example, "_FILE_" is converted into the file name of the file in which the "_FILE_" is written. In addition, "LINE_" is converted into the line number at which the "_LINE_" is written. Furthermore, "func" is converted into the function name of the function in which the "func" is written.

Meanwhile, the code T21 is code that defines the char-type global variables "g_filename" and "g_funcname" and the int-type global variable "g_line".

The code T22 is code that defines the contents of the function "setCodeInfo". The function "setCodeInfo" is defined as a function that receives three arguments "filename", "line", and "funcname", and assigns them to the global variables "g_filename", "g_line", and "g_funcname", respectively.

In this example, at the position of the code T17 of the source file 34 (see FIG. 31), the preprocessor replaces "SET( )" with "setCodeInfo(_FILE_, _LINE_, func_)". The preprocessor also converts "_FILE_" into the string of characters "mnemonic.h", which is the file name of the source file 34 that is a caller, and converts "LINE_" into "21", which is the line number of the function "SET( )" in the source file 34. Additionally, the preprocessor replaces "_func" with the function name "ADD" of the mnemonic function ADD that is the function from which the function "SET( )" is called.

Thus, when the executable program generated by compiling the source file 34 is executed, "mnemonic.h" is stored in the variable "g_filename" and "ADD" is stored in the variable "g_funcname" when the part corresponding to the code T17 is executed. In addition, "21" is stored in the variable "g_line".

FIG. 33 schematically illustrates pseudo source code in the source file 41 for the application program written in C++ by the developer. Here, discussed is the case that the file name of the source file 41 is "sample.cpp" and the developer writes code T25 to code T28 in that source file 41.

The code T25 is a statement that defines variables "reg0", "reg1", and "imm0". The variables "reg0" and "reg1" are defined as a Reg type. The variable "imm0" is defined as an Imm type.

The code T26 is a statement that assigns values to the members of the variables "reg0", "reg1", and "imm0". In this example, "0" is assigned to the member "regIndex" of the variable "reg0", and "1" is assigned to the member "regIndex" of the variable "reg1". In addition, "100000" is assigned to the member "value" of the variable "imm0".

The code T27 is code that calls the mnemonic function ADD and passes the contents of the variables "reg0", "reg1", and "imm0" to the respective arguments of the mnemonic function ADD. Here, the developer writes the code T27 inside a try statement to handle an exception. As described above, the value "100000" is assigned to the variable "imm0", but the possible value for the third argument of the mnemonic function add is limited to the range of −1024 to +1023 according to the instruction information 33 (see FIG. 30). Thus, when this mnemonic function ADD is executed, an exception is thrown in the code T16 (see FIG. 31).

The code T28 is code that outputs the contents of the global variables "g_filename", "g_line", and "g_funcname" to the standard output when an exception is thrown as described above. In this example, since "mnemonic.h", "22", and "ADD" are stored in "g_filename", "g_line", and "g_funcname", respectively as described above, these are output to the standard output.

To generate the executable program 44 (see FIG. 13) from this source file 41, the program group 42 performs build according the process in FIG. 13 described in the first embodiment.

FIG. 34 illustrates an example output to the standard output when the executable program 44 generated in the above described manner is executed on the target machine 1 (see FIG. 1).

In this example, the third argument of the mnemonic function ADD in the source file 41 (see FIG. 33) does not satisfy the restriction defined in the instruction information 33 as described above. Thus, an error message 74 "Invalid immediate value of OP2 is passed to add mnemonic function." in the code T16 (see FIG. 31) is output to the standard output. Further, a message 75 indicating the contents of the global variables "g_filename", "g_line", and "g_funcname" in the code T28 (see FIG. 33) is also output to the standard output.

The developer can notice that the argument of the mnemonic function ADD is erroneously specified somewhere in the program written by the developer, based on the error message 74 and the message 75.

However, the message 75 outputs not "sample.cpp", which is the file name of the source file 41 that contains a mistake, but the file name "mnemonic.h" of the source file 34 that defines the mnemonic function ADD. Furthermore, the line number and the function name in the message 75 are not the line number and the function name in the source file 41 (sample.cpp) that has erroneous description but the line number and the function name of the source file 34 (mnemonic.h).

This means that the developer does not know where in the source file 41 (sample.cpp) for the application program there is a mistake, and it takes a long time to debug the application program, resulting in inefficient program development. Furthermore, when multiple source files 41 are given to the compiler, it is also difficult to determine which source file 41 is incorrect in its use of the ADD function.

In light of this, the fourth embodiment allows the developer to debug the program easily as follows.

Functional Configuration

Figure 35:
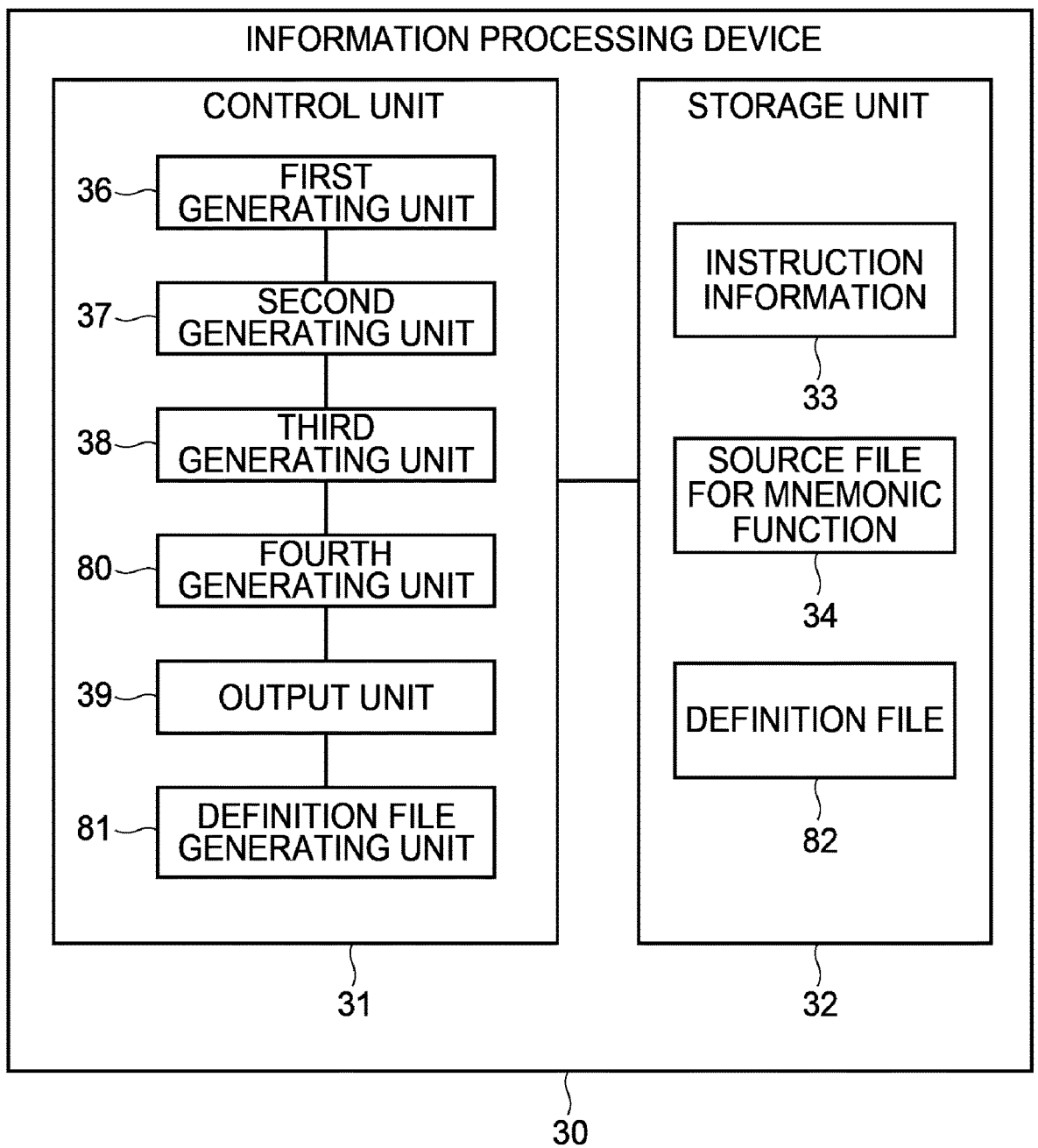
FIG. 35 is a functional block diagram of an information processing device in accordance with the fourth embodiment.

FIG. 35 is a functional block diagram of the information processing device 30 in accordance with the fourth embodiment. In FIG. 35, the same reference characters are assigned to the same elements as those described in the first to third embodiments, and the description thereof is omitted in the following description.

As illustrated in FIG. 35, the control unit 31 of the information processing device 30 includes a fourth generating unit 80 and a definition file generating unit 81 in addition to the first to third generating units 36 to 38 and the output unit 39.

FIG. 36 schematically illustrates C++ pseudo source code for the mnemonic function ADD generated by the control unit 31 in the fourth embodiment. Here, discussed is the case that the control unit 31 generates the source file 34 with the file name "mnemonic.h", and generates the mnemonic function ADD in the generated source file 34.

In FIG. 36, the same reference characters are assigned to the same kinds of code as described in the first to third embodiments, and the description thereof is omitted in the following description.

As illustrated in FIG. 36, in the fourth embodiment, as in the first embodiment, the first generating unit 36 generates the code T11 in the argument of the mnemonic function ADD. That code T11 is code that declares the respective types of the arguments "OP0", "OP1", and "OP2" corresponding to three operands of the instruction add.

In addition, the first generating unit 36 writes the code T18 at the first position of the arguments of the mnemonic function ADD. The code T18 is code that defines the respective types of the variables "strFile", "line", and "strFunc". Among these variables, "strFile" is a string-type variable for storing the file name. In addition, "line" is an integer-type variable for storing the line number in the file.

Furthermore, "strFunc" is a string-type variable for storing the function name. Note that the order in which the variables "strFile", "line", and "strFunc" are described in the code T18 is not particularly limited. The first generating unit 36 can describe these variables in any order in the code T18.

The control unit 31 generates the code T12 to the code T16 in the source file 34 as in the third embodiment.

Further, in addition to the code T12 to the code T16, the fourth generating unit 80 generates the code T17 in the source file 34. As in the example illustrated in FIG. 31, the code T17 is code that calls the function "SET( )". The fourth generating unit 80 generates code that defines the process of the function "SET( )" in part of the source file 34.

FIG. 37 illustrates C++ pseudo source code for the function "SET( )" generated by the fourth generating unit 80 in the fourth embodiment.

Unlike the example of FIG. 32, in the fourth embodiment, the variables "strFile", "line", and "strFunc", which are the arguments of the mnemonic function ADD, are passed to the arguments of the function "setCodeInfo" in the code T20.

Each of the code T21 and the code T22 is code that assigns the arguments of the function "setCodeIndo" to the global variables "g_filename", "g_funcname", and "g_line", respectively, as in the example of FIG. 32.

The definition file generating unit 81 (FIG. 35) is a processing unit that generates a definition file 82 illustrated in FIG. 38.

FIG. 38 schematically illustrates pseudo source code in the definition file 82 generated by the definition file generating unit 81.

As illustrated in FIG. 38, the definition file 82 has multiple macros starting with "# define". These macros are generated by the definition file generating unit 81 so as to correspond to each of the mnemonic functions. Each macro is a macro that gives the preprocessor an instruction to add a new variable to the arguments of each mnemonic function in the source file for the application program written by the developer. This will be described using the source file illustrated in FIG. 39.

FIG. 39 illustrates C++ pseudo code in the source file 41 for the application program written by the developer in the fourth embodiment. In FIG. 39, the same reference character as that in FIG. 33 is assigned to the same code as that described in FIG. 33, and the description thereof is omitted in the following description.

In this source file 41, unlike the example of FIG. 33, the developer writes the function name of the mnemonic function in lowercase letters of the alphabet. For example, the developer writes code T27 that calls the mnemonic function, as "add(reg0, reg1, imm0)" at line 101. The member "value" of the third argument "imm0" of the mnemonic function add in that code T27 is assigned "100000" by the code T26. This value is an inappropriate value that does not satisfy the restriction "−1024 to +1023" in the instruction information 33 (see FIG. 30).

The behavior of the macro "# define add( . . . ) ADD (_FILE_, _LINE_, _func_, _VA_ARGS_)" at the first line of the definition file 82 (see FIG. 38) in this case will be described.

This macro instructs the preprocessor to replace the function name "add" of the mnemonic function add in the source file 41 with "ADD". Further, this macro instructs the preprocessor to add "_FILE_", "_LINE_", and "_func_" as new arguments before the arguments of the mnemonic function add. Note that "_VA_ARGS_" is a predefined identifier indicating the variable-length argument in which the arguments of the mnemonic function add are to be stored. As a result, the description "add(reg0, reg1, imm0);" at line 101 of the source file 41 is replaced with "ADD (_FILE_, _LINE_, _func_, reg0, reg1, imm0);" by the preprocessor.

As described above, each of "_FILE_", "_LINE_", and "_func_" is a C++ predefined macro or a predefined identifier that is to be replaced with a file name, a line number, and a function name, respectively. The preprocessor replaces these predefined macros and predefined identifiers with a file name, a line number, and a function name, respectively. The file name and the line number are examples of function information about the mnemonic function add. Therefore, the file name for which the mnemonic function "add" is written, the line number, and the function name are to be passed as the arguments of the mnemonic function "ADD".

The definition file generating unit 81 refers to the instruction information 33 (see FIG. 30) to generate such a definition file 82, and stores the definition file 82 in the storage unit 32.

For example, the definition file generating unit 81 reads the instruction information 33 row by row to obtain the function name, and generates a directive for each function name. When the obtained function name is SUB, the definition file generating unit 81 generates the directive "# define sub( . . . ) SUB(_FILE_, _LINE_,_func_, _ VA_ARGS_)" in the definition file 82.

Development Environment

Figure 40:
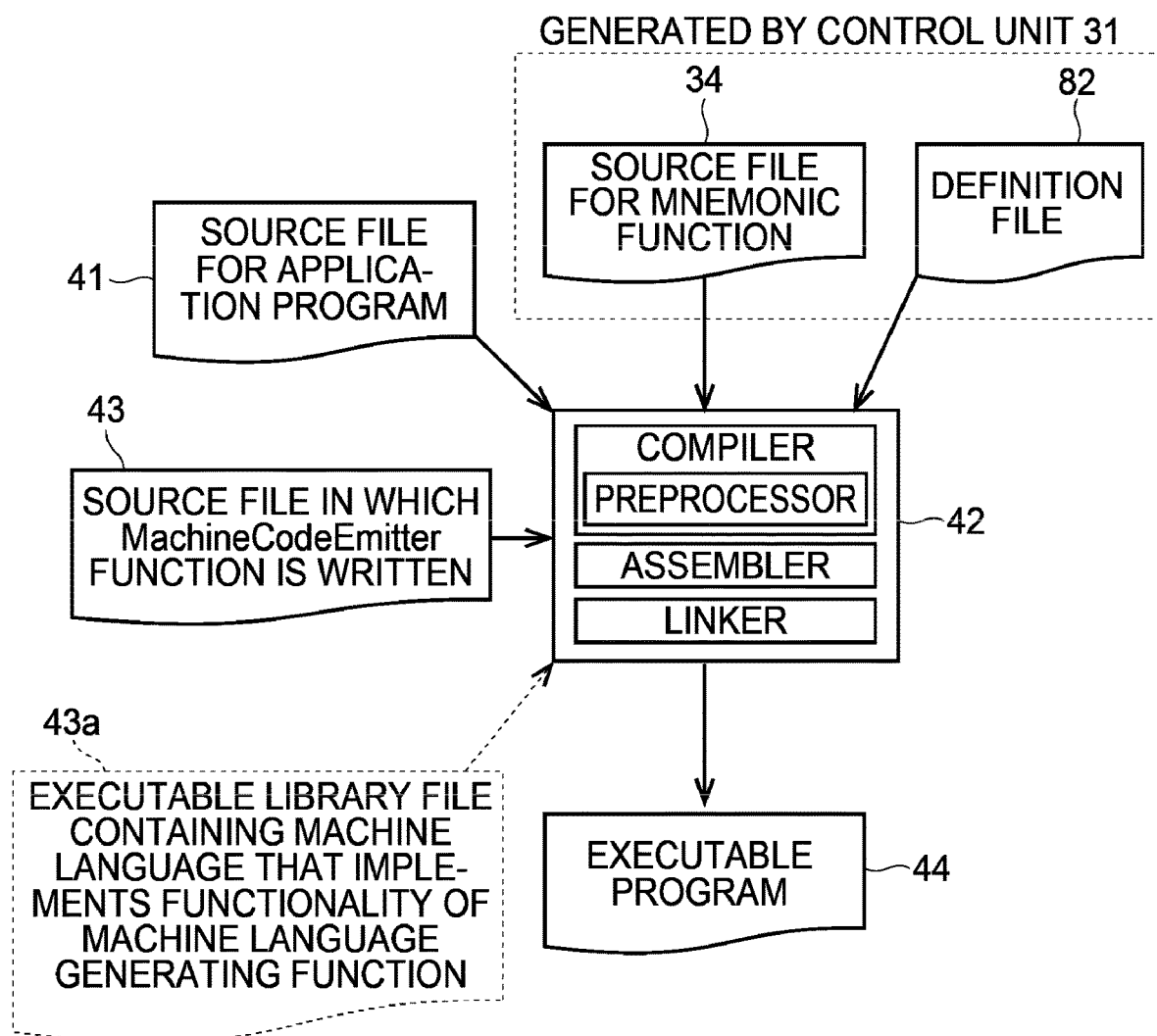
FIG. 40 schematically illustrates a development environment in accordance with the fourth embodiment.

FIG. 40 schematically illustrates a development environment in accordance with the fourth embodiment.

In FIG. 40, the same reference characters as those in the first embodiment are assigned to the same elements as those described in FIG. 13 of the first embodiment, and the description thereof is omitted in the following description.

Here, discussed is the case that a development environment is built inside the information processing device 30. In this case, the control unit 31 generates the source file 34 for the mnemonic functions and the definition file 82.

The developer creates the source file 41 for the application program in C++. Hereinafter, described is the case that the developer generates the source file 41 having the file name "sample.cpp" as illustrated in FIG. 39 and writes the code T27, which calls the mnemonic function, at line 101 of the source file 41.

Under the instruction of the developer, the program group 42 including the compiler, the assembler, and the linker performs build. When building, the preprocessor included in the compiler first reads the source files 34, 41, and 43 and the definition file 82. As described in the first embodiment, instead of the source file 43 in which the MachineCodeEmitter function is written, the executable library file 43a in binary format in which the machine language generating function is written may be used.

Then, the preprocessor replaces "add(reg0, reg1, imm0);" at line 101 of the source file 41 with "ADD(_FILE_, _ LINE_, func_, reg0, reg1, imm0);" according to the definition file 82.

At this time, the preprocessor stores the contents at the time of execution of line 101 of the source file 41 in each of "_FILE_", "_LINE_", and "_func_". Therefore, "sample.cpp", which is the file name of the source file 41, is stored in "FILE_". The line number "101" at which the mnemonic function add is written in the source file 41 is stored in "_LINE_". Further, "func0", which is the function name after the replacement by the preprocessor, is stored in "_func_".

The contents "sample.cpp", "101", and "func0" are passed to the mnemonic function ADD (see FIG. 36) in the source file 34 as the arguments "strFile", "line", and "strFunc", respectively. When the function "SET( )" in the code T17 of the source file 34 is executed in this state, the assignments to the global variables "g_filename", "g_funcname", and "g_line" are performed. This means that "sample.cpp", "func 0", and "101" are assigned to the global variables "g_filename", "g_funcname", and "g_line", respectively, in the fourth embodiment.

Then, the compiler generates an assembly file, and the assembler converts the assembly file into a machine-language instruction sequence to generate an object file.

Thereafter, the linker generates the executable program 44 in binary format that is executable on the processor 2 (see FIG. 1) by linking the object file and various libraries.

FIG. 41 illustrates an example output to the standard output when the executable program 44 generated in the above described manner runs on the target machine 1 (see FIG. 1).

As described above, in this example, the third argument of the mnemonic function ADD in the source file 41 does not satisfy the restriction defined in the instruction information 33. Thus, an error message 84 "Invalid immediate value of OP2 is passed to add mnemonic function." in the code T16 (see FIG. 36) is output to the standard output.

Further, a message 85 indicating the contents of the global variables "g_filename", "g_line", and "g_funcname" in the code T28 of FIG. 39 is also output to the standard output.

At this time, in the fourth embodiment, because of use of the definition file 82 (see FIG. 38), the contents of the global variables "g_filename", "g_funcname", and "g_line" are "sample.cpp", "func 0", and "101", respectively, as described above.

Therefore, by executing the code T28 of the source file 41 (see FIG. 39), the message 85 "file name:sample.cpp, line: 101, function name: func 0" containing these contents is output to the standard output. The message 85 contains the file name "sample.cpp" of the source file 41 for the application program written by the developer himself/herself, the line number "101" at which an error occurs in the source file 41, and the function name "func0" in which the error occurs.

Therefore, unlike the example of FIG. 34, in the fourth embodiment, the developer can identify the file name of the source file 41 in which an error occurs, and the position at which the error occurs in the source file 41, and the developer can easily debug the program. As a result, the time required for debugging can be reduced, and the program development can be made to be more efficient.

To obtain the same result as that in FIG. 41, it may be conceivable for the developer to write the source file 41 for application illustrated in FIG. 42 without using the definition file 82.

FIG. 42 schematically illustrates C++ pseudo source code in the source file 41 in accordance with another example of the fourth embodiment.

In the example of FIG. 42, the developer writes the mnemonic function ADD in the source file 41, and also writes predefined macros and predefined identifiers "_FILE_", "_LINE_", and "_func_" in the arguments of the mnemonic function ADD by himself/herself. In this case, the file name of the source file 41 in which the mnemonic function ADD is written is stored in "_FILE_". The line number at which the mnemonic function ADD is written in the source file 41 and the function name of the function func0 including that description are stored in "_LINE_" and "_func_", respectively.

The description described above can be used to obtain the same result as that in FIG. 41. However, it is very complicated for the developer to write the predefined macros and predefined identifiers "_FILE_", "_LINE_", and "_func_" in the arguments of the function by himself/herself, and the developer may make a typo.

By contrast, in the fourth embodiment, since the definition file generating unit 81 automatically generates the definition file 82, such a complication can be avoided and the burden on the developer can be reduced.

In the fourth embodiment, as illustrated in FIG. 36, the code T18 indicating the arguments of the mnemonic function ADD is written at the position before the code T11 in the source file 34, but it may be conceivable that this order may be reversed and the code T18 is written at the position after the code T11. In this case, the macro corresponding to the mnemonic function ADD becomes "# define add( . . . ) ADD(_VA_ARGS_, _FILE_, _LINE_, _func_)" in which the order of the arguments is reversed. However, such a description will cause inconvenience described below.

Figure 43A:
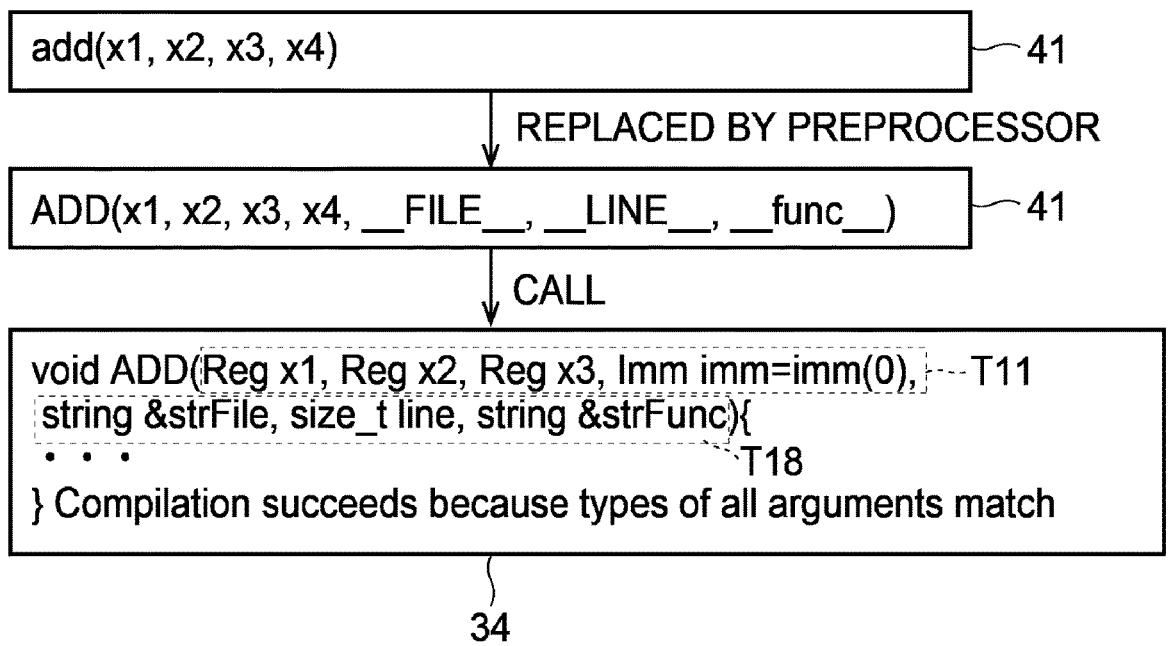
FIG. 43A and FIG. 43B schematically illustrate inconvenience caused when a variadic macro is written in the end of a function that is to be replaced with a macro.
Figure 43B:
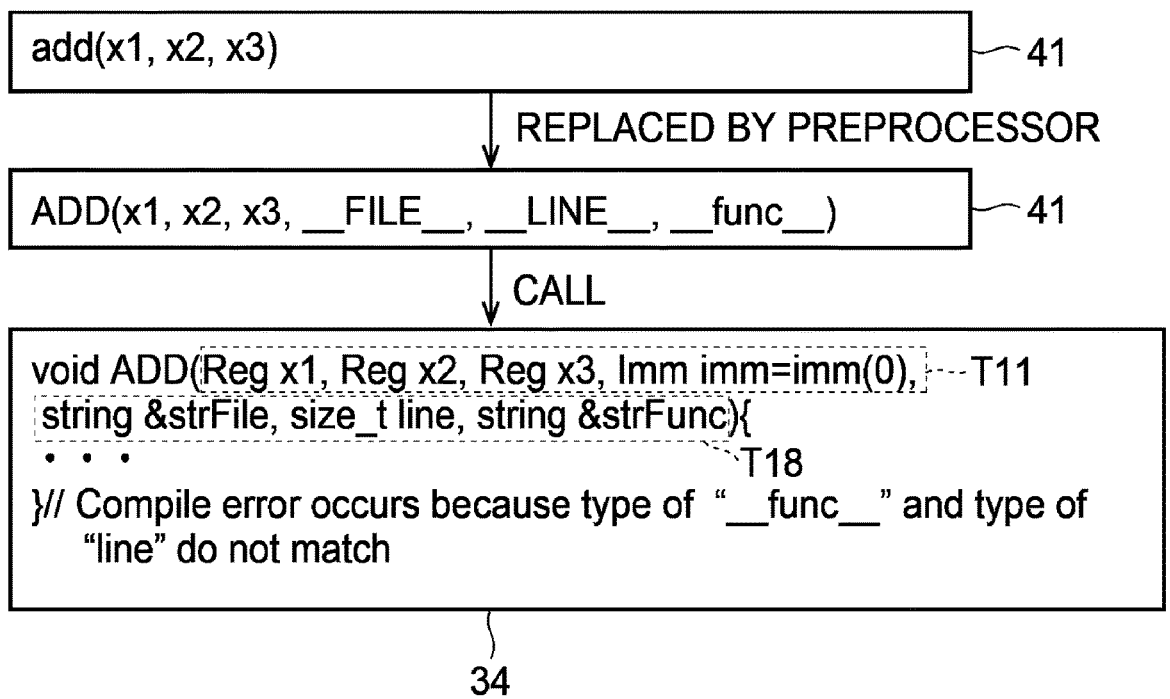

FIG. 43A and FIG. 43B schematically illustrate inconvenience caused by reversing the order of arguments.

Some instructions have the same mnemonic but different numbers of operands in the instructions included in the instruction set. The add instruction is one of such instructions. Here, discussed is the case that there are the add instruction taking three register-type operands, and the add instruction taking four operands, which are three register-type operands and one immediate value type operand.

The add instruction taking three register-type operands is an instruction to add up the values of the registers specified by the second and third operands, and store the result in the register specified by the first operand.

On the other hand, the add instruction taking four operands, which are three register-type operands and one immediate value type operand, is an instruction to add up the values of the registers specified by the second and third operands. The result of the addition is added to the immediate value specified by the third operand, and the result is stored in the first operand.

In this case, the former add instruction can be considered the case that the immediate value of the latter add instruction is set to "0".

In C++, even when multiple arguments are written in the definition of the function, the function can be called by omitting the last argument of which the value when omitted is specified. Using this feature, in the fourth embodiment, only the definition of one mnemonic function add corresponding to two types of add instructions with different numbers of operands is written in the source file 34.

Discussed is the case that "void ADD(Reg x1, Reg x2, Reg x3, Imm imm=imm(0), string & strFile, size_t line, string & strFunc" in FIG. 43A and FIG. 43B is the mnemonic function ADD taking the arguments of each of the two types of add instructions into consideration.

In this mnemonic function ADD, the first four arguments "x1", "x2", "x3", and "imm" correspond to the operands of the add instruction. As described above, in this example, the order of the code T11 and the code T18 is in the reverse order of the example of FIG. 36.

FIG. 43A in which the compilation succeeds in this case will be described first. The example of FIG. 43A assumes the case that the developer wrote the code "add(x1, x2, x3, imm)" in the source file 41 for the application program. The code "add(x1, x2, x3, imm)" is the code corresponding to the add instruction taking four operands.

In this case, the preprocessor replaces the above code with "ADD(x1, x2, x3, imm, _FILE_, _LINE_, _func_)" using the macro "# define add( . . . ) ADD(_VA_ARGS_, _FILE_, _LINE_, _func_)" in the definition file 82.

The code after replacement calls the definition of the function ADD in the source file 34. In this case, the types of the seven arguments of the function ADD in the source file 34 match the types of the arguments of "ADD(x1, x2, x3, imm, _FILE_, _LINE_, func_)", respectively. Therefore, the compilation succeeds.

FIG. 43B schematically illustrates an example in which the compilation fails.

Here, assumed is the case that the developer wrote the code "add(x1, x2, x3)" containing three arguments corresponding to the add instruction taking three operands in the source file 41. In this case, the preprocessor replaces the above code with "ADD(x1, x2, x3, _FILE_, _LINE_, _func_)" using the macro "# define add( . . . ) ADD(_VA_ARGS_, _FILE_, _LINE_, _func_)" in the definition file 82.

Then, the code after replacement calls the definition of the function ADD in the source file 34.

However, the sixth argument "_func_" of "ADD(x1, x2, x3, _FILE_, LINE_, _func_)" is of a string type, while the sixth argument "line" of the function ADD in the source file 34 is of an integer type. Therefore, the type of the argument of the caller does not match the type of the argument of the callee, and thus, the compilation fails.

To avoid such an inconvenience, as illustrated in FIG. 36, the first generating unit 36 preferably writes the code T18 that describes the function information such as the file name and the like at the first position of the arguments of the mnemonic function ADD.

For example, discussed is the case that the code T18 is written at the position before the code T11 as in the fourth embodiment by reversing the order of the code T11 and the code T18 in the source file 34 of FIG. 43B, and "add(x1, x2, x3)" is written in the source file 41. In this case, the preprocessor replaces the above code with "ADD(_FILE_, _LINE_, _func_, x1, x2, x3)" using the macro "# define add( . . . ) ADD(_FILE_, _LINE_, _func_, _VA_ARGS_)" in the definition file 82. The compiler is able to recognize, according to C++ syntax, that the call to the ADD function having six arguments is the call to the function ADD taking seven arguments in the source file 34 with the seventh arguments omitted.

In addition, the six arguments, which are not omitted, are of a string type, an integer type, a string type, a register type, a register type, and a register type, respectively, and match the first six arguments of the ADD function defined in the source file 34. Therefore, the above description "add(x1, x2, x3)" can be compiled without errors.

Process Flow

A description will be given of a generation method of the definition file in accordance with the fourth embodiment.

Figure 44:
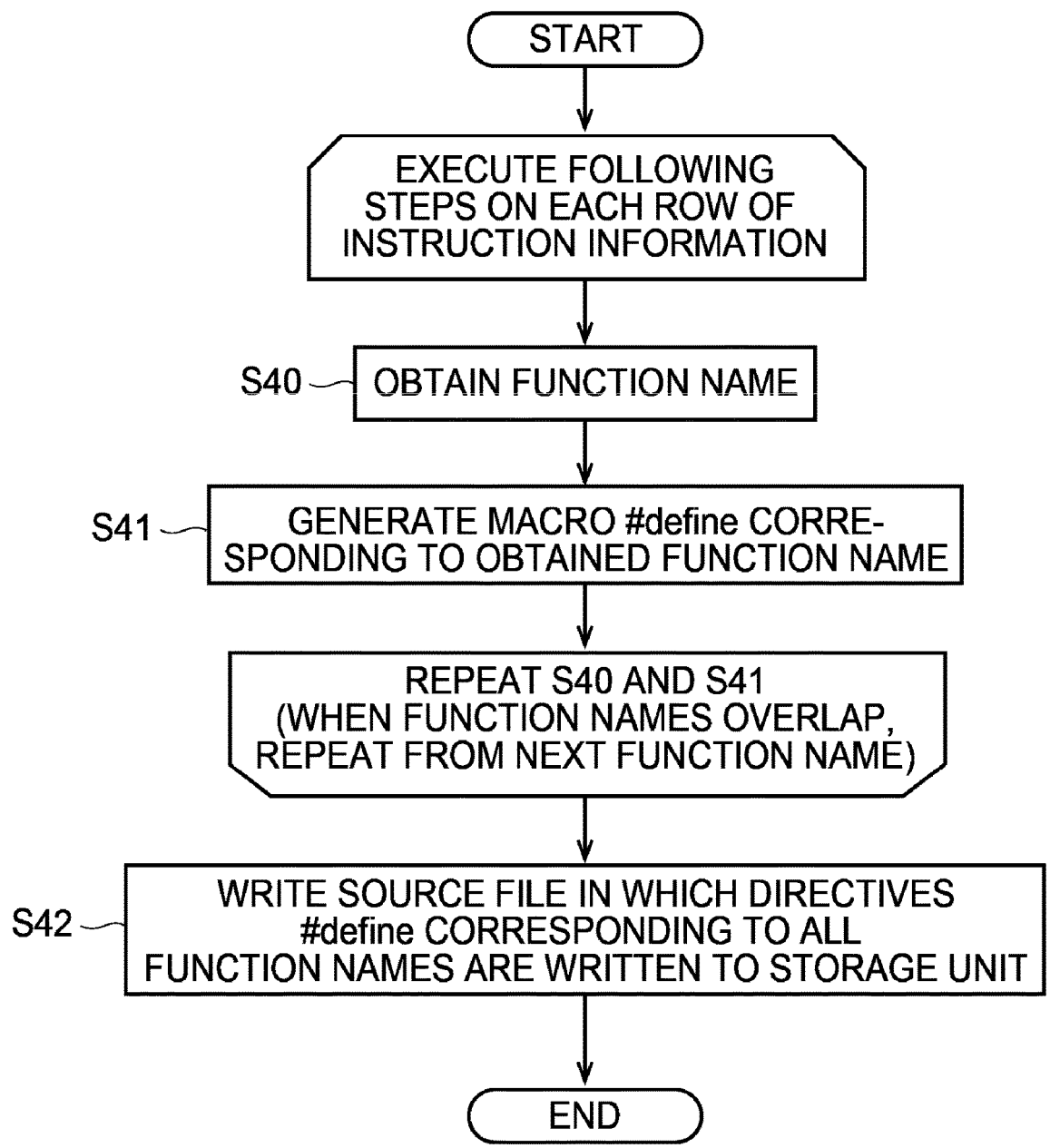
FIG. 44 is a flowchart of a generation method of the definition file in accordance with the fourth embodiment.

FIG. 44 is a flowchart illustrating the generation method of the definition file in accordance with the fourth embodiment.

First, the definition file generating unit 81 obtains the function name from the instruction information 33 (see FIG. 30) (step S40), and generates the macro # define corresponding to the obtained function name (step S41). For example, discussed is the case that the definition file generating unit 81 obtained the function name "ADD" int the first row of the instruction information 33. In this case, the definition file generating unit 81 generates the macro "# define add( . . . ) ADD(_FILE_, LINE_, _func_, _VA_ARGS_)".

The definition file generating unit 81 then repeats step S40 and step S41 for each row of the instruction information 33

(see FIG. 30). The above macro "# define add( . . . ) ADD(_FILE_, _LINE_, _func_, _VA_ARGS_)" has the same format for all function names except for the function name "add" before replacement and the function name "ADD" after replacement. When the function names are the same, the macros are the same. Thus, when the function names overlap, the definition file generating unit 81 repeats step S40 and step S41 from the next function name of the instruction information 33.

Thereafter, the definition file generating unit 81 writes the definition file 82 in which the macros corresponding to all the function names in the instruction information 33 to the storage unit 32 (step S42).

In the above described manner, the basic steps of the generation method of the definition file in accordance with the fourth embodiment are finished.

Hardware Configuration

Next, a description will be given of a hardware configuration of the information processing device 30 in accordance with the first to fourth embodiments.

Figure 45:
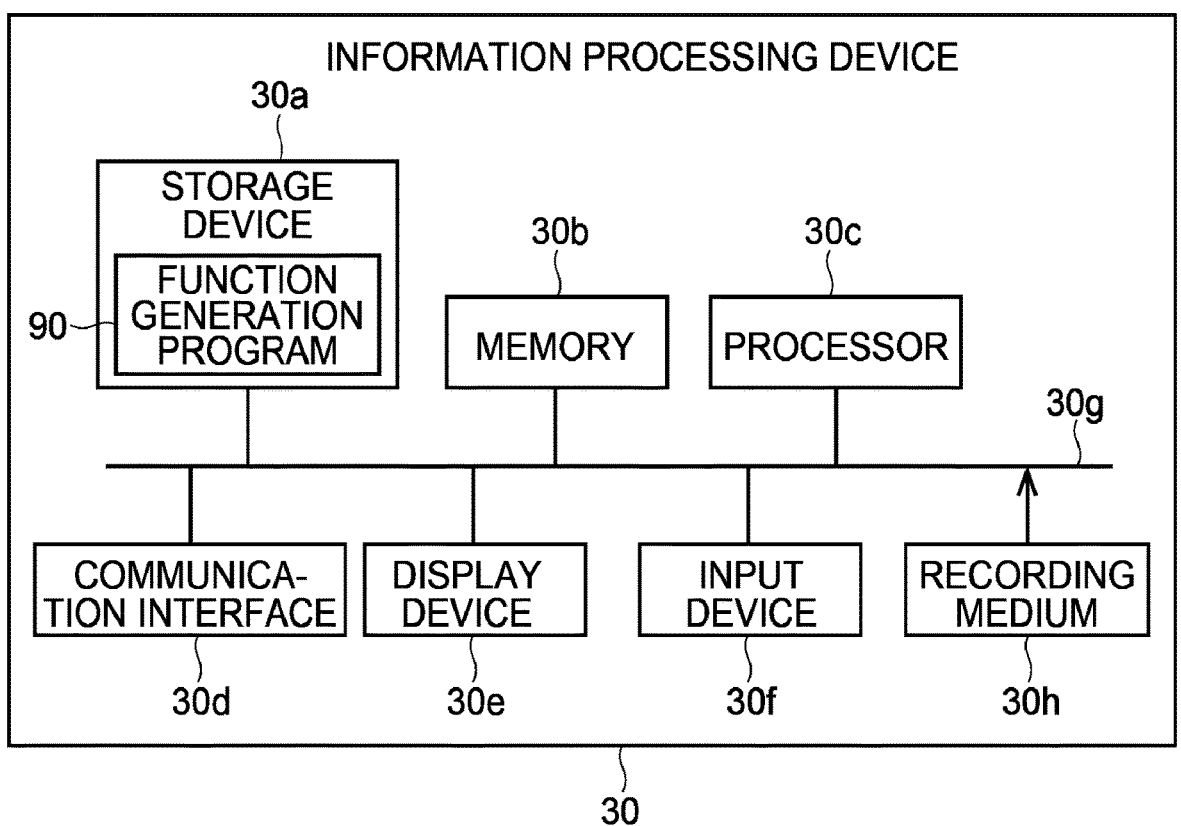
FIG. 45 is a hardware configuration diagram of the information processing device in accordance with the first to fourth embodiments.

FIG. 45 is a hardware configuration diagram of the information processing device 30 in accordance with the first to fourth embodiments.

As illustrated in FIG. 45, the information processing device 30 includes a storage device 30a, a memory 30b, a processor 30c, a communication interface 30d, a display device 30e, and an input device 30f. These units are connected to each other by a bus 30g.

The storage device 30a is a non-volatile storage device such as an HDD or a solid state drive (SSD), and stores a function generation program 90 in accordance with the present embodiments.

The function generation program 90 may be recorded in a computer-readable recording medium 30h, and the processor 30c may be caused to read the function generation program 90 from the computer-readable recording medium 30h.

Examples of such a recording medium 30h include, but are not limited to, a physically portable recording medium such as a compact disc read only memory (CD-ROM), a digital versatile disc (DVD), and a universal serial bus (USB) memory. Also, a semiconductor memory such as a flash memory, or a hard disk drive may be used as the recording medium 30h. Such recording media 30h are not temporary media such as carrier waves not having a physical form.

Further, the function generation program 90 may be stored in a device connected to a public line, the Internet, a local area network (LAN), or the like. In this case, the processor 30c reads and executes the function generation program 90.

Meanwhile, the memory 30b is hardware that temporarily stores data like a DRAM or the like. The function generation program 90 is loaded into the memory 30b.

The processor 30c is hardware such as a central processing unit (CPU) or a graphical processing unit (GPU) that controls the components of the information processing device 30 and executes the function generation program 90 in cooperation with the memory 30b.

As the memory 30b and the processor 30c cooperate to execute the function generation program 90, the control unit 31 including the first generating unit 36, the second generating unit 37, the third generating unit 38, and the output unit 39 in FIG. 11 is implemented. The fourth generating unit 80 and the definition file generating unit 81 in FIG. 35 are also implemented by the memory 30b and the processor 30c cooperatively executing the function generation program 90.

The storage unit 32 in each of FIG. 11 and FIG. 35 is implemented by the storage device 30a and the memory 30b.

The communication interface 30d is an interface for connecting the information processing device 30 to the network such as a LAN.

The display device 30e is hardware such as a liquid crystal display, and displays prompts that prompt the developer to input various information and an error message at compile time. The input device 30f is hardware device such as a keyboard and a mouse. For example, the developer instructs the information processing device 30 to execute the compilation by operating the input device 30f.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium storing a function generation program that causes a computer to execute a process, the process comprising:
   referring to a storage unit that stores instruction information about an instruction to generate a first function that corresponds to the instruction and receives one or more arguments representing one or more operands of the instruction;
   generating first code inside the first function, where the first code calls a second function that returns machine language representing a process executed by the instruction for the one or more operands represented by the one or more arguments; and
   generating second code inside the first function, where the second code writes the machine language in a memory.

2. The non-transitory computer-readable recording medium according to claim 1,
   wherein the instruction information is information storing the number of the one or more operands and a name of the instruction in association with each other,
   wherein the process further comprises:
      referring to the storage unit to give a function name identical to the name of the instruction to the first function; and
      referring to the storage unit to generate third code that declares the same number of the one or more arguments as the number of the one or more operands.

3. The non-transitory computer-readable recording medium according to claim 1,
   wherein the instruction information is information that stores one or more types each representing a kind of a corresponding one of the one or more operands and the instruction in association with each other,
   wherein the process further comprises:
      referring to the storage unit to generate third code that declares one or more types of the one or more arguments to be the one or more types of the one or more operands; and
      generating fourth code that converts one or more variables received as the one or more arguments by the first function into the one or more types of the one or more arguments of the second function, and passes resulting one or more variables to the second function.

4. The non-transitory computer-readable recording medium according to claim 1,
wherein the instruction information is information that stores one or more types each representing a kind of a corresponding one of the one or more operands, the instruction, and a function name of the first function in association with each other, and
wherein the instruction information stores the instruction in plural, and the instructions include first and second instructions having identical function names and different types of the one or more operands.

5. The non-transitory computer-readable recording medium according to claim 1,
wherein the instruction information stores one or more restrictions each being imposed on each of the one or more operands and the instruction in association with each other, and
wherein the process further comprises referring to the storage unit to generate third code that throws an exception when the one or more operands corresponding to the one or more arguments violate the one or more restrictions.

6. The non-transitory computer-readable recording medium according to claim 5, wherein the process further comprises generating a definition file, where the definition file gives a preprocessor a directive to add an argument to fourth code, which is written in a source file so as to call the first function, and store function information about the first function in the source file in the argument that has been added.

7. The non-transitory computer-readable recording medium according to claim 6,
wherein the instruction information is information that stores the instruction, the one or more restrictions, and a function name of the first function in association with each other, and
wherein the generating of the definition file includes referring to the storage unit that stores the instruction information to generate a macro that gives the directive for each of the function name.

8. The non-transitory computer-readable recording medium according to claim 7,
wherein the first function has the one or more arguments in plural, and
wherein the process further comprises generating the argument in which the function information is to be stored, at a first position of the arguments of the first function.

9. The non-transitory computer-readable recording medium according to claim 6, wherein the function information is one of following components: a file name of the source file, a line number at which the fourth code that calls the first function is written in the source file, and a function name of the first function.

10. The non-transitory computer-readable recording medium according to claim 1, wherein the generating of the first function includes generating the first function as a macro.

11. A function generation method implemented by a computer, the function generation method comprising:
referring to a storage unit that stores instruction information about an instruction to generate a first function that corresponds to the instruction and receives one or more arguments representing one or more operands of the instruction;
generating first code inside the first function, where the first code calls a second function that returns machine language representing a process executed by the instruction for the one or more operands represented by the one or more arguments; and
generating second code inside the first function, where the second code writes the machine language in a memory.

12. An information processing device comprising:
a memory; and
a processor coupled to the memory and configured to:
refer to a storage unit that stores instruction information about an instruction to generate a first function that corresponds to the instruction and receives one or more arguments representing one or more operands of the instruction,
generate first code inside the first function, where the first code calls a second function that returns machine language representing a process executed by the instruction for the one or more operands represented by the one or more arguments, and
generate second code inside the first function, where the second code writes the machine language in a memory.

* * * * *